United States Patent
Fukuda et al.

(10) Patent No.: US 7,844,575 B2
(45) Date of Patent: Nov. 30, 2010

(54) METHOD AND A SYSTEM FOR DATA MIGRATION

(75) Inventors: Satoshi Fukuda, Yokohama (JP); Yuji Mizote, Kamakura (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 11/968,223

(22) Filed: Jan. 2, 2008

(65) Prior Publication Data

US 2009/0030953 A1    Jan. 29, 2009

(30) Foreign Application Priority Data

Jul. 24, 2007    (JP) .............................. 2007-191582

(51) Int. Cl.
*G06F 12/00* (2006.01)
(52) U.S. Cl. ........................ 707/612; 707/662; 707/665
(58) Field of Classification Search .......... 707/999.203, 707/612
See application file for complete search history.

(56) References Cited

U.S. PATENT DOCUMENTS

| | | | | |
|---|---|---|---|---|
| 5,870,537 | A * | 2/1999 | Kern et al. ...................... 714/6 |
| 6,640,291 | B2 * | 10/2003 | Fujibayashi et al. ......... 711/162 |
| 7,177,991 | B2 | 2/2007 | Yamamoto et al. |
| 7,447,843 | B2 * | 11/2008 | Ishikawa et al. ............. 711/129 |
| 2003/0033494 | A1 * | 2/2003 | Fujibayashi et al. ......... 711/162 |
| 2003/0229645 | A1 * | 12/2003 | Mogi et al. .................. 707/102 |
| 2004/0049553 | A1 | 3/2004 | Iwamura et al. |
| 2004/0068629 | A1 * | 4/2004 | Fujibayashi et al. ......... 711/162 |
| 2004/0158656 | A1 * | 8/2004 | Fujibayashi et al. ........... 710/38 |
| 2005/0251620 | A1 * | 11/2005 | Matsunami et al. ......... 711/114 |

FOREIGN PATENT DOCUMENTS

JP    2004-220450    8/2004

* cited by examiner

*Primary Examiner*—Don Wong
*Assistant Examiner*—Binh V Ho
(74) *Attorney, Agent, or Firm*—Brundidge & Stanger, P.C.

(57) ABSTRACT

A data migration method is provided which can provide a user at a low cost with a function of migrating data from an existing storage when an additional storage is installed. A business application is operated by using a business server and a first storage. When the capacity and performance of data used by a business application become insufficient, a second storage is installed to compensate for insufficiency. In this case, the management server collectively copies data and configuration information of the first storage to the second storage, the data and configuration information are deleted at a later time in accordance with migration command information selected from a GUI screen. It is therefore possible to migrate necessary data and configuration information of the first storage to the second storage, without making a user be conscious of the details of the configuration information of logical devices of a storage.

7 Claims, 29 Drawing Sheets

FIG.6

24 DELETION DEVICE MANAGEMENT TABLE

| | DEVICE NAME | LOGICAL DEVICE | DELETION OBJECT | DELETION COMPLETION |
|---|---|---|---|---|
| 2421 | FIRST STORAGE DEVICE | 001 | — | — |
| 2422 | FIRST STORAGE DEVICE | 002 | YES | YES |
| 2423 | FIRST STORAGE DEVICE | 003 | — | — |
| 2424 | SECOND STORAGE DEVICE | 001 | YES | NO |
| 2425 | SECOND STORAGE DEVICE | 002 | — | — |
| 2426 | SECOND STORAGE DEVICE | 003 | YES | NO |
| | ⋮ | ⋮ | ⋮ | ⋮ |

Column IDs: 2411, 2412, 2413, 2414

14 DEVICE MANAGEMENT TABLE

| | 1411 | 1412 | 1413 | 1414 | 1415 |
|---|---|---|---|---|---|
| | ID | DEVICE NAME | LUN | CORRESPONDING LOGICAL DEVICE ID | PERMISSION OF ACCESS FROM BUSINESS APPLICATION |
| 1421 | ID001 | FIRST STORAGE DEVICE | 001 | ID004 | PERMITTED |
| 1422 | ID002 | FIRST STORAGE DEVICE | 002 | ID005 | PERMITTED |
| 1423 | ID003 | FIRST STORAGE DEVICE | 003 | ID006 | PERMITTED |
| 1424 | ID004 | SECOND STORAGE DEVICE | 001 | ID001 | INHIBITED |
| 1425 | ID005 | SECOND STORAGE DEVICE | 002 | ID002 | INHIBITED |
| 1426 | ID006 | SECOND STORAGE DEVICE | 003 | ID003 | INHIBITED |
| | .. | .. | .. | .. | .. |

FIG.28

LOGICAL DEVICE MIGRATION DESTINATION SELECTION SCREEN 1 — 211

LOGICAL DEVICE MIGRATION DESTINATION SELECTION 2111

| LOGICAL DEVICE | CAPACITY | PERFORMANCE (IOPS) | MIGRATION DESTINATION DEVICE |
|---|---|---|---|
| Vol 01 | 200 GB | 50 MB/s | DEVICE 1 ▽ |
| Vol 02 | 200 GB | 40 MB/s | DEVICE 2 ▽ |
| Vol 03 | 200 GB | 10 MB/s | DEVICE 1 ▽ |
| Vol 04 | 200 GB | 10 MB/s | DELETION ▽ |
| Vol 05 | 500 GB | 20 MB/s | DEVICE 1 |
| | | | DEVICE 2 — 2116 |
| | | | DELETION |

UNIFORM CAPACITY ALLOCATION — 2115

UNIFORM PERFORMANCE ALLOCATION

LOGICAL DEVICE ALLOCATION AFTER MIGRATION 2112

| FIRST STORAGE DEVICE | SECOND STORAGE DEVICE |
|---|---|
| Vol 01 | Vol 02 |
| Vol 03 | Vol 05 |

FIRST STORAGE DEVICE:
- TOTAL CAPACITY : 1,500 GB
- USED CAPACITY : 400 GB
- REMAINING CAPACITY : 1,100 GB

SECOND STORAGE DEVICE:
- TOTAL CAPACITY : 2,500 GB
- USED CAPACITY : 700 GB
- REMAINING CAPACITY : 1,800 GB

NEXT — 2113    CANCEL — 2114

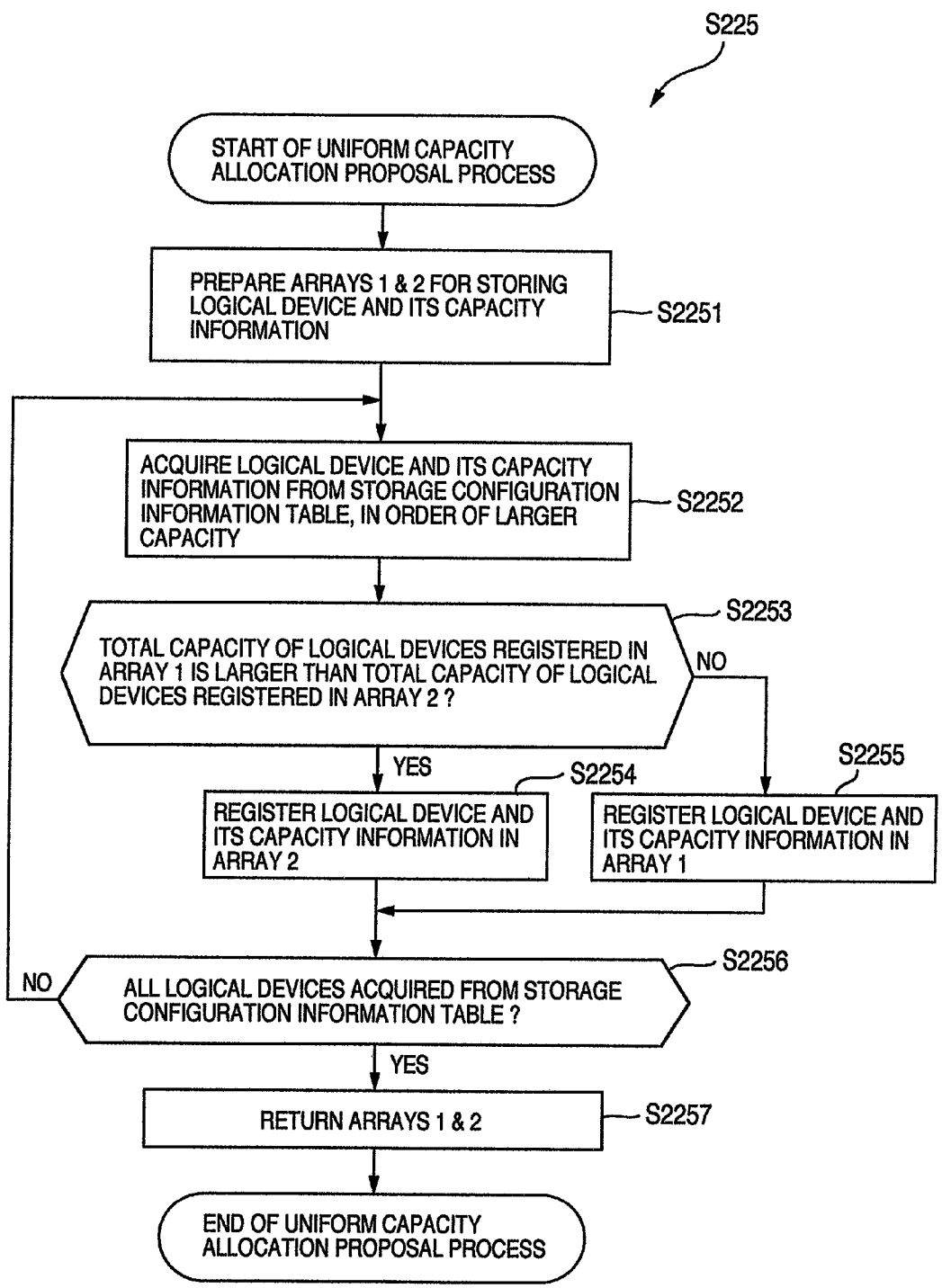

METHOD AND A SYSTEM FOR DATA MIGRATION

INCORPORATION BY REFERENCE

The present application claims priority from Japanese application JP2007-191582 filed on Jul. 24, 2007, the content of which is hereby incorporated by reference into this application.

BACKGROUND OF THE INVENTION

The present invention relates to a data migration method, a data migration system and a data migration program to be used when a new storage device is additionally installed.

Operation management of storage devices for small and medium business (SMB) markets is required to be performed easily without being conscious of the details of a storage device structure, because of absence of a full-time administrator or other reasons. This is also applicable to operating a storage device upon replacement and additional installation. Storage management software for supporting running management is also required to be software which is simple and easy to use.

For example, JP-A-2004-220450 describes a method of migrating a portion of data of an existing storage device to an additional storage device when the additional storage device is installed, to thereby solve an insufficient capacity of the existing storage device.

SUMMARY OF THE INVENTION

With this method described in JP-A-2004-220450, however, in order for storage management software to migrate data in an existing storage device, it is necessary to perform various settings for an additional storage device, as performed for the existing storage device, settings including creating a logical device, assignment of a path between the business server and additional storage device, security settings and the like. It is also necessary to copy data from an existing storage device to an additional storage device in a logical device unit over the storage devices.

If various settings and data copy for an additional storage device are to be performed by existing storage management software, a work load on the storage management software increases and a development cost becomes high, resulting in expensive storage management software. It is desired in SMB markets to realize simple storage management and at the same time inexpensive storage management software.

The present invention has been made to solve the above-described issues, and it is an object of the present invention to provide a data migration method, a data migration system and a data migration program, capable of supplying a user at a low cost with a function of migrating data in an existing storage device to an additional storage device when the latter is installed.

In order to solve the above-described issues, data and configuration information of an existing storage device are collectively copied to an additional storage, and the data and configuration information are deleted at a later time.

A data migration method of the present invention for a computer system for managing an operation of a first storage device (e.g., first storage device 3) having one or more logical devices and an operation of a business server (e.g., business server 1) by using a storage management server (e.g., management server 2), the first storage device, the business server and the storage management server being interconnected via a network, the data migration method migrating the logical device possessed by the first storage device to a second storage device (e.g., second storage device 4) having one or more logical devices when the second storage device is additionally installed, the data migration method comprises steps of: stopping an application on the business server which accesses the first storage device; copying data and configuration information of all logical devices possessed by the first storage device, to the second storage device; displaying a screen for making an administrator select whether each logical device possessed by the first storage device is retained in the first storage device or migrated to the second storage device; upon reception of migration command by administrator selection, deleting data and configuration information of the logical device under the migration command, from the first storage device, and deleting data and configuration information of the logical device under the retention command, from the second storage device; and reactivating the application to allow the application to access the logical devices of the first storage device and the second storage device.

According to the present invention, it is possible to supply a user at a low cost with a function of migrating data in an existing storage device to an additional storage device when the latter is installed.

The other objects and methods of achieving the objects will be readily understood in conjunction with the description of embodiments of the present invention and the drawings.

BRIEF DESCRIPTION OF THE DRAWINGS

FIG. 6 is an illustrative diagram showing a deletion device management table.

FIG. 28 is an illustrative diagram showing another example of the selection screen for a logical device migration destination.

FIG. 29 is a flow chart illustrating a uniform capacity allocation proposal process.

DETAIL DESCRIPTION OF THE EMBODIMENTS

Embodiments of the present invention will now be described with reference to the accompanying drawings.

First Embodiment

Figure 1:
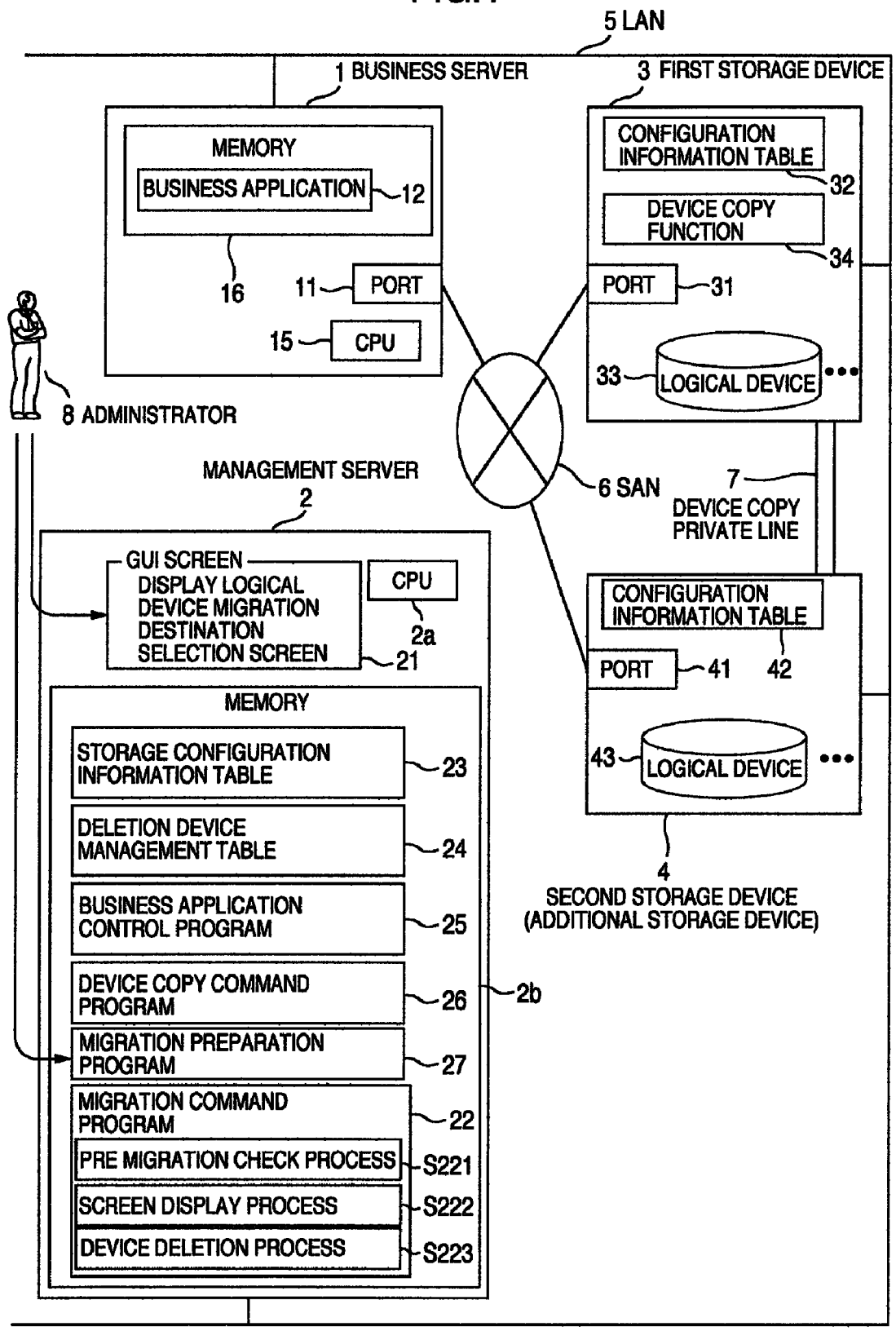
FIG. 1 is a block diagram of a storage management system according to a first embodiment.

FIG. 1 is a block diagram showing a storage management system of the first embodiment. The storage management system is constituted of a business server 1, a management server 2, a first storage device 3, and a second storage device (additional storage device) 4. The business server 1, management server 2, first storage device 3 and second storage device 4 are connected to a local area network (LAN) 5, and information reference, setting and the like are performed among these servers and devices via LAN 5. The business server 1, first storage device 3 and second storage device 4 are connected to a storage area network (SAN) 6 via ports 11, 31 and 41, respectively, and data to be used for businesses is transmitted and received via SAN 6.

The business server 1 may be a personal computer, and has a storage (not shown) such as a hard disk, a CPU 15, a memory 16 and the like. A business application is prepared being stored in the storage. When the business application 12 is to be executed, the business application 12 is loaded in the memory 16 and executed by CPU 15. Data used by the business application 12 is stored in a logical device 33 of the first storage device 3. A plurality of logical devices 33 may exist.

The management server 2 may be a personal computer, and has a display device (not shown) for displaying information, an input device (not shown) such as a keyboard and a mouse; a storage (not shown) such as a hard disk, a CPU 2a, a memory 2b and the like. Stored and prepared in the storage are a migration command program 22 (including a pre-migration check process S221, a screen display process S222, and a device deletion process S223), a storage configuration information table 23, a deletion device management table 24, a business application control program 25 for controlling the business application 12, a device copy command program 26 for coping configuration information and data among the storage devices, and a migration preparation program 27. For example, when data migration command is to be effected, the migration command program 22 is loaded in the memory 2b and executed by CPU 2a. The input device is used for an administrator 8 to input a data migration command. On a display screen of the display device, a GUI screen 21 is displayed for receiving a data migration command from the administrator 8.

The detailed contents will be later described for the storage configuration information table 23 (refer to FIG. 5), deletion device management table 24 (refer to FIG. 6), migration command program 22 (refer to FIGS. 7 to 9), business application control program 25 (refer to FIG. 10), device copy command program 26 (refer to FIG. 11) and migration preparation program 27 (refer to FIG. 12).

The first storage device 3 has a configuration information table 32, a logical device 33 and a device copy function 34. One or more logical devices 33 exist in the first storage device 3, and stored in the configuration information table 32 is information on the capacity and identifier of each logical device and on to which business server each logical device is connected.

Figure 2:
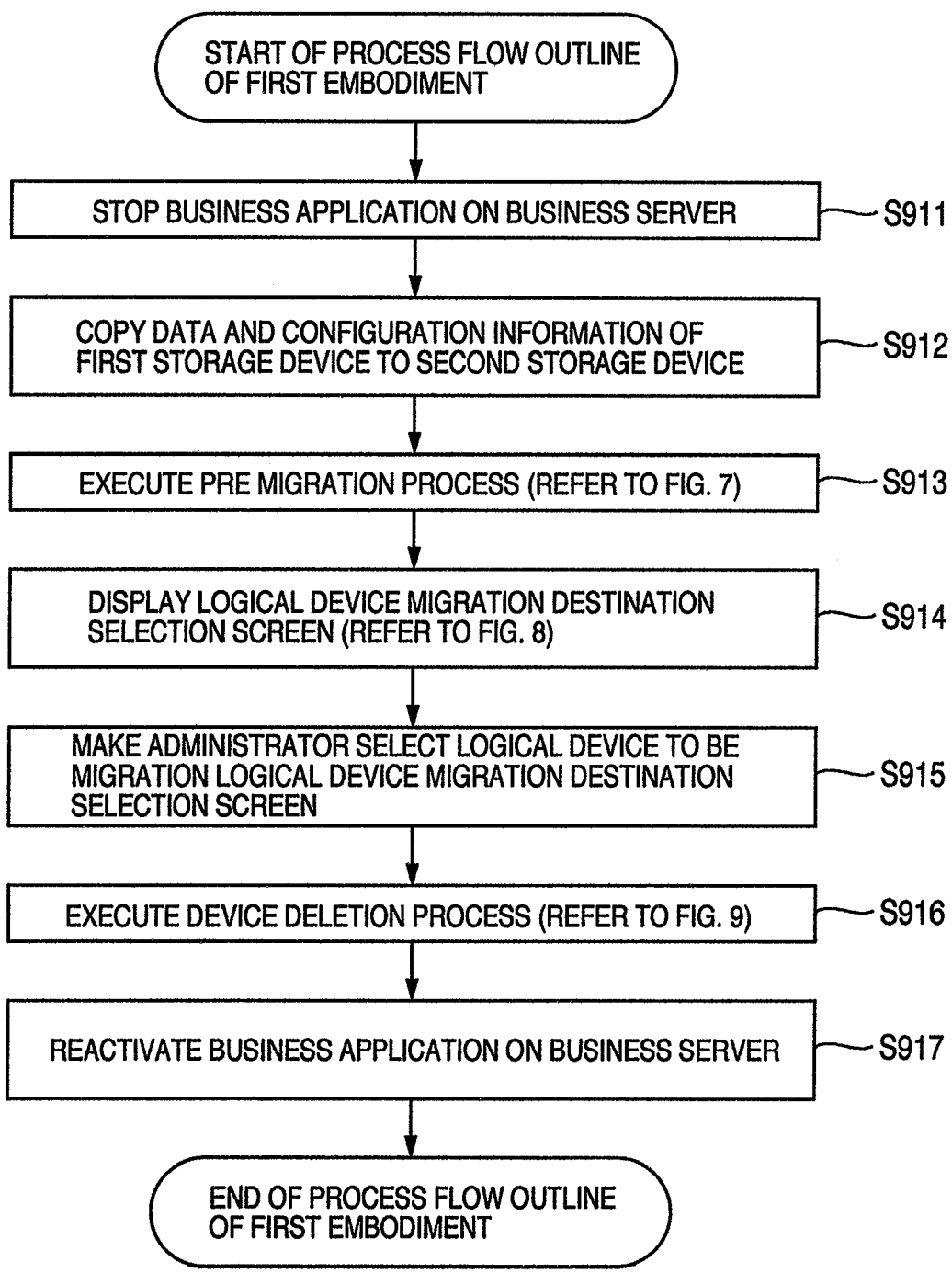
FIG. 2 is a flow chart illustrating an outline of a data migration process according to the first embodiment.

The administrator 8 runs the business application 12 by using the business server 1 and first storage device 3. The administrator 8 monitors each day the capacity and performance of data used by the application 12. If the capacity and performance of the first storage device 3 becomes insufficient for the capacity and performance of data used by the business application 12, the administrator 8 newly installs the second storage device 4 to compensate for the insufficiency, and to migrate a portion of data of the business application 12 stored in the first storage device 3, to the second storage device 4, to thereby compensate for the insufficiency of the capacity and performance. The second storage device 4 has a configuration information table 42 and a logical device 43. With reference to FIG. 2, description will be made on a data migration sequence between the first storage device 3 and second storage device 4. When the configuration information table 32 and logical device 33 are to be copied to the second storage device 4, a device copy private line 7 is used. If the device copy private line 7 is not used, copy may be performed via another communication path such as SAN 6.

FIG. 2 is a flow chart illustrating the outline of a data migration process of the first embodiment. Description will be made by referring to FIG. 1 when necessary. In this embodiment, first in a process S911 the migration preparation program 27 whose execution is commanded by the administrator 8 executes the business application control program 25. The executed business application program 25 stops the business application 12 on the business server 1 to thereafter advance to the next process.

In a process S912 the device copy command program 26 executed by the migration preparation program 27 copies the configuration information and data stored in the first storage device 3 to the second storage device 4 to thereafter advance to the next process. The process S912 is executed by the device copy command program 26 and device copy function 34.

Figure 7:
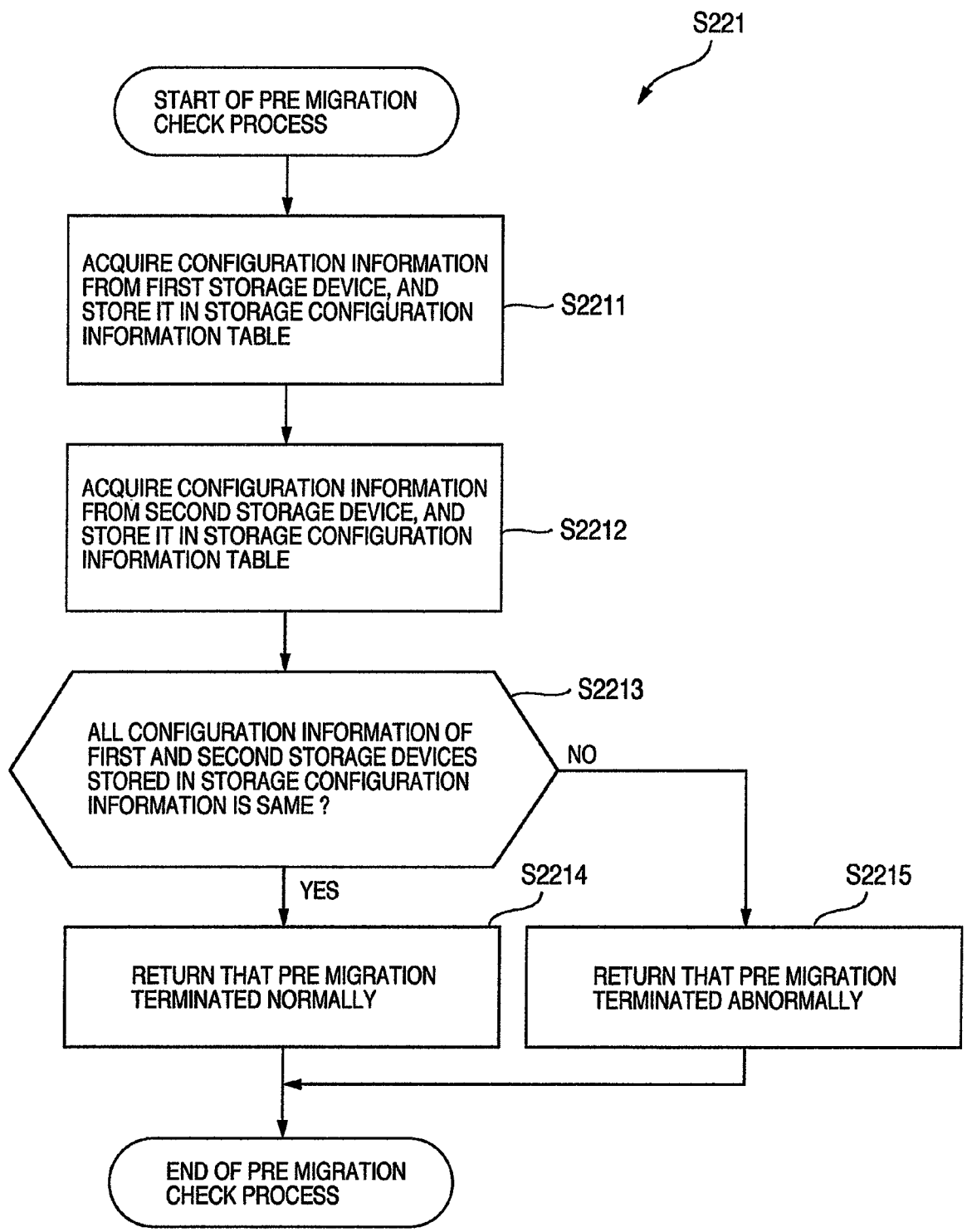
FIG. 7 is a flow chart illustrating a pre-migration check process.

In a process Step S913 the migration command program 22 whose execution is performed upon command from the administrator 8 executes (performs) a pre-migration check process S221 (refer to FIG. 7). The executed pre-migration check process 211 checks whether data in the first storage device 3 can be migrated to the second storage device 4, to thereafter advance to the next process.

In a process S914, the migration command program 22 executes the screen display process S222 (refer to FIG. 8) to display a logical device migration destination selection screen and thereafter advance to the next process.

In a process S915 the migration command program 22 makes the administrator 8 select a logical device to be migrated from the first storage device 3 to the second storage device 4, on the displayed logical device migration destination selection screen, to thereby receive a list of selected logical devices as an input parameter and thereafter advance to the next process.

In a process S916 the migration command program 22 executes (performs) the device deletion process S223 (refer to FIG. 9), to thereby delete the logical devices and configuration information from the first storage device 3 and second storage device 4 in accordance with the received logical device list and thereafter advance to the next process.

In a process S917 the migration command program 22 executes the business application control program 25. The executed business application control program 25 reactivates the business application 12 on the business server 1.

The outline of the process flow of the first embodiment has been described above.

Next, with reference to FIGS. 3 to 12, detailed description will be made on the process flow to be executed when data is migrated.

First, the migration preparation program 27 is executed upon command from the administrator 8. The migration preparation program 27 executes the business application control program 25 and device copy command program 26.

Figure 10:
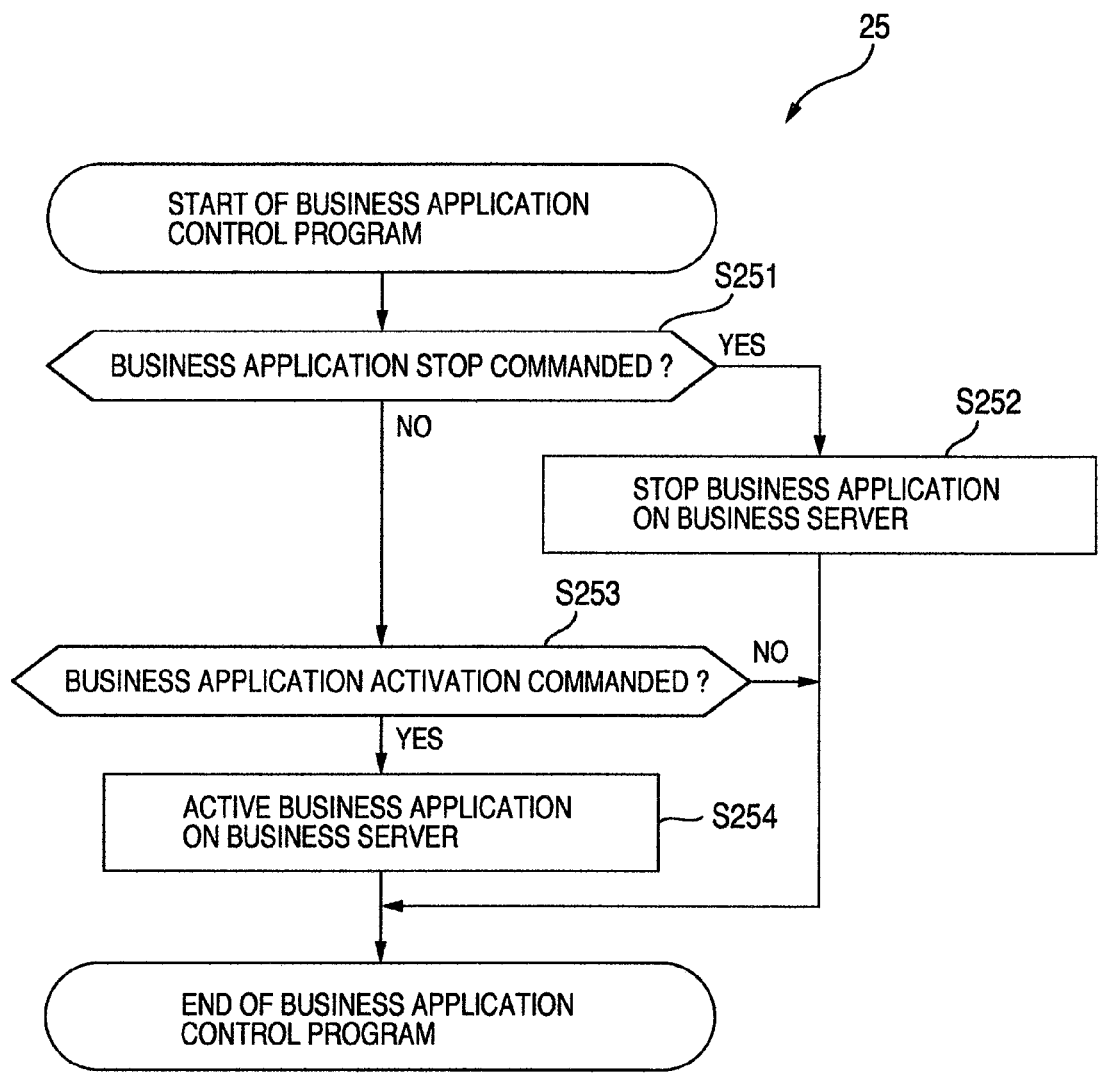
FIG. 10 is a flow chart illustrating a process to be executed by a business application control program.
Figure 12:
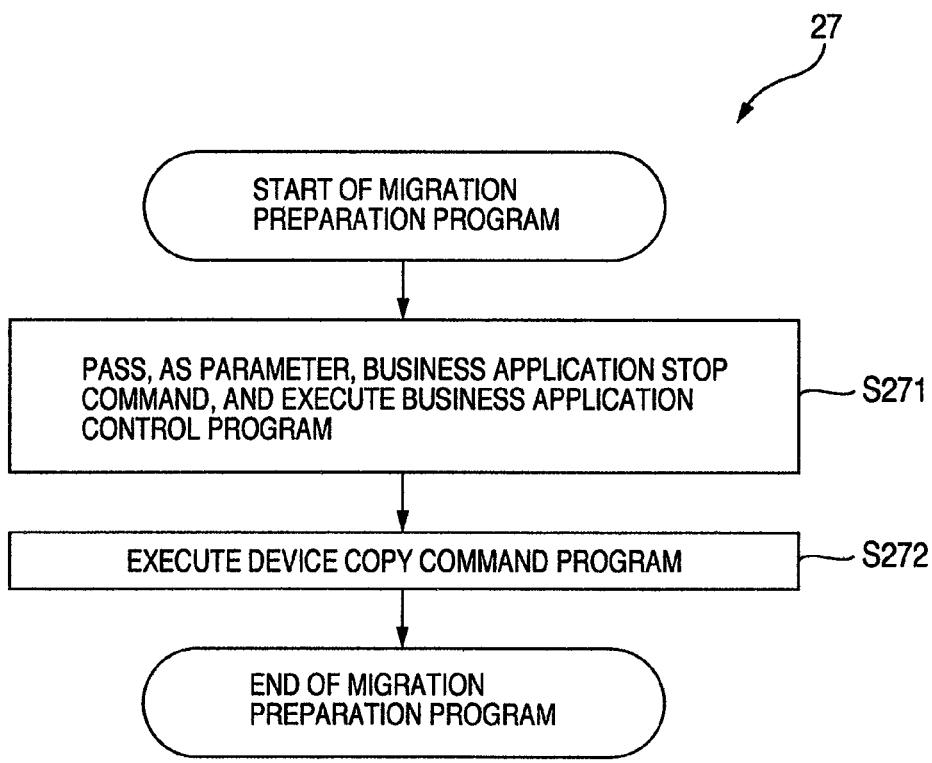
FIG. 12 is a flow chart illustrating a process to be executed by a migration preparation program.

FIG. 12 is a flow chart illustrating a process to be executed by the migration preparation program. First, in a process S271 the migration preparation program 27 passes as a parameter a business application stop command to execute the business application control program 25. With reference to FIG. 10, the business application control program 25 will be described.

FIG. 10 is a flow chart illustrating a process to be executed by the business application control program. In a process S251 the business application control program 25 judges whether a business application stop is commanded or not. If the business application stop is to be commanded (Yes in the process S251), the business application control program 25 executes a process S252 to stop the business application 12 on the business server 1 so as not to update data in the logical device 33 of the first storage device 3, to thereafter terminate the business application control program 25.

If the business application stop is not commanded (No in the process S251), in a process S253 the business application control program 25 judges whether a business application start is commanded or not. If the business application start is to be commanded (Yes in the process S253), in a process S254 the business application control program 25 activates the business application 12 on the business server 1 to thereafter terminate the business application control program 25. If the business application start is not commanded (No in the process S253), the business application control program 25 is terminated.

Figure 11:
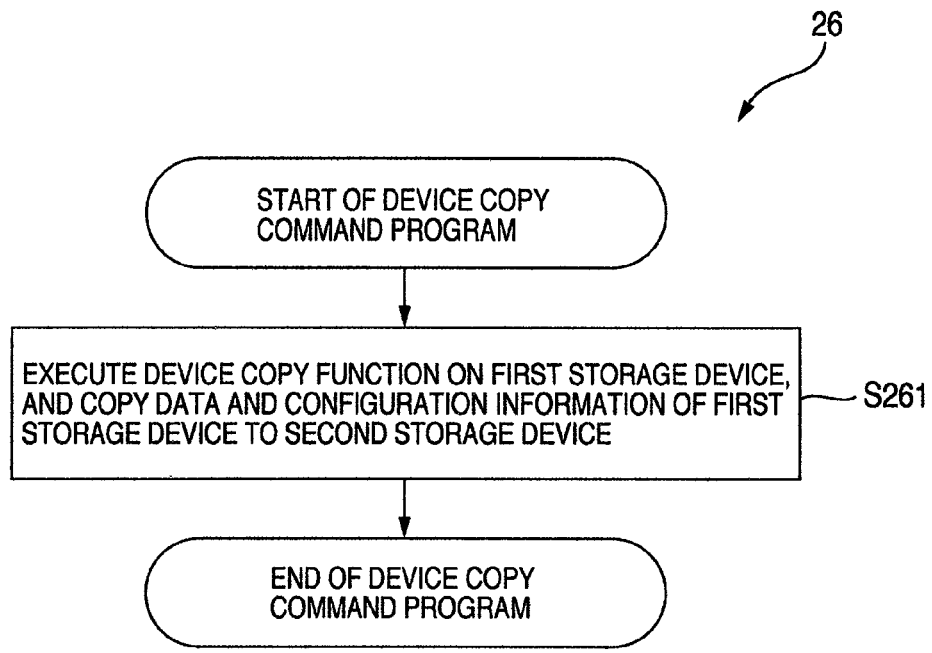
FIG. 11 is a flow chart illustrating a process to be executed by a device copy command program.

Reverting to FIG. 12, in a process S272 the migration preparation program 27 executes the device copy command program 26. With reference to FIG. 11, the device copy command program 26 will be described.

FIG. 11 is a flow chart illustrating a process to be executed by the device copy command program. In a process S261 the device copy command program 26 copies data in the configuration information table 32 and logical device 33 of the first storage device 3 to the configuration information table 42 and logical device 43 of the second storage device 4 via the device copy private line 7, by using the device copy function 34 of the first storage device 3. After copy completion, the device copy command program 26 notifies via the display device or the like the administrator 8 to the effect that the copy is completed and migration preparation is completed, to thereafter terminate the process. Returning to FIG. 12 the migration preparation program 27 terminates the process.

Although the configuration information table 32 and logical device 33 are copied to the second storage device 4 by using the function (e.g., the device copy function 34) of hardware in the first storage unit 3, the configuration information table 32 and logical device 33 may be read from the first storage device 3 by the management server 2 without using the hardware function, and copied to the second storage device 4.

When the configuration information table 32 and logical device 33 are copied to the second storage device 4, another communication path such as SAN 6 may be used for copying, without involving the device copy private line 7.

Next, upon reception of the migration preparation completion notice, the migration command program 22 is executed upon command from the administrator 8. The executed migration command program 22 executes the pre-migration check process S221, screen display process S222 and device deletion process S223. First, the pre-migration process S221 is executed.

FIG. 7 is a flow chart illustrating the pre-migration check process. In a process S2211 the pre-migration check process S221 acquires the configuration information on the first storage device 3, and loads the acquired configuration information in first storage device configuration information 231 of the storage configuration information table 23 shown in FIG. 5. Next, in a process S2212 configuration information on the second storage device 4 is acquired and stored in second storage device configuration information 236 of the storage configuration information table 23. Next, in a process S2213 the first storage device configuration information 231 is compared with the second storage device configuration information 236 to check whether all the information is the same. If the check indicates that all the information is the same (Yes in the process 2213), in a process S2214 that the pre-migration check process S221 is completed normally is returned to thereafter terminate the pre-migration check process S221. Then, the process advances to the screen display process S222 (refer to FIG. 8). If the check indicates that all the information is not the same (No in the process 2213), in a process S2215 that the pre-migration check process S221 is terminated abnormally is returned to thereafter terminate the pre-migration check process S221. In this case, the migration process is intercepted.

Figure 5:
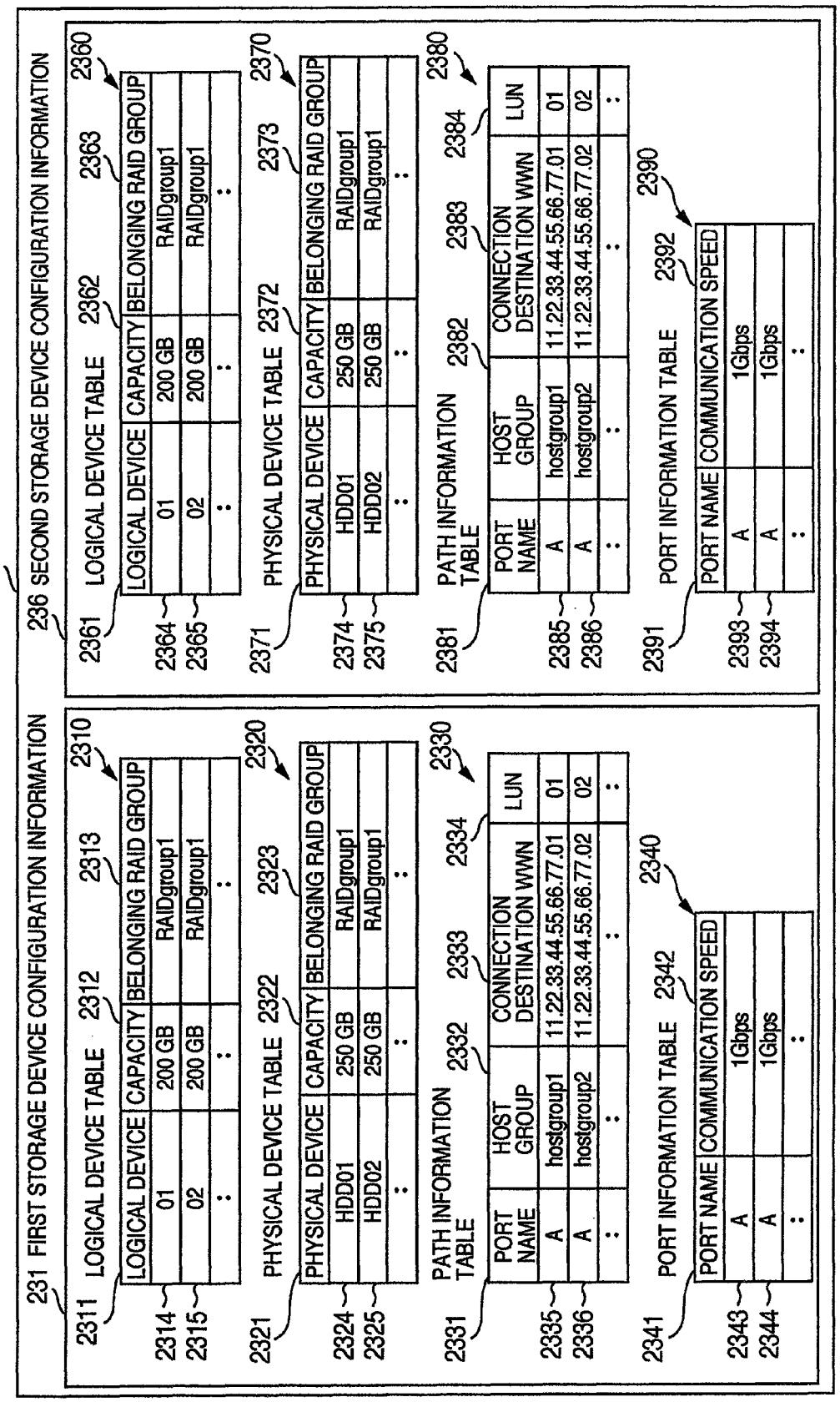
FIG. 5 is an illustrative diagram showing a storage configuration information table.

FIG. 5 is an illustrative diagram showing the storage configuration information table. The storage configuration information table 23 has the first storage device configuration information 231 and second storage device configuration information 236. The first storage device configuration information 231 is constituted of a logical device table 2310, a physical device table 2320, a path information table 2330 and a port information table 2340. The logical device table 2310 is constituted of columns of a logical device 2311, a capacity 2312, and a belonging redundant array of inexpensive disks (RAID) group 2313. The physical device table 2320 is constituted of columns of a physical device 2321, a capacity 2322, and a belonging RAID group 2323. The path information table 2330 is constituted of columns of a port name 2331, a host group 2332, a connection destination World Wide Name (WWN) 2333 and a logical unit number (LUN) 2334. The port information table 2340 is constituted of columns of a port name 2341 and a communication speed 2342.

Similarly, the second storage device configuration information 236 is constituted of a logical device table 2360, a physical device table 2370, a path information table 2380 and a port information table 2390. The logical device table 2360 is constituted of columns of a logical device 2361, a capacity 2362, and a belonging RAID group 2363. The physical device table 2370 is constituted of columns of a physical device 2371, a capacity 2372, and a belonging RAID group 2373. The path information table 2380 is constituted of columns of a port name 2381, a host group 2382, a connection destination WWN 2383 and a LUN 2384. The port information table 2390 is constituted of columns of a port name 2391 and a communication speed 2392.

As shown in FIG. 5, it can be understood that data of the configuration information table 32 and logical device 33 of the first storage device 3 is copied to the configuration information table 42 and logical device 43 of the second storage device 4. Specifically, the contents at rows 2314 and 2315 are coincident with the contents at rows 2364 and 2365. The contents at rows 2324 and 2325 are coincident with the contents at row 2374 an 2375. The contents at rows 2335 and 2336 are coincident with the contents at rows 2385 and 2386. The contents at rows 2334 and 2344 are coincident with the contents at rows 2393 and 2394.

Figure 3:
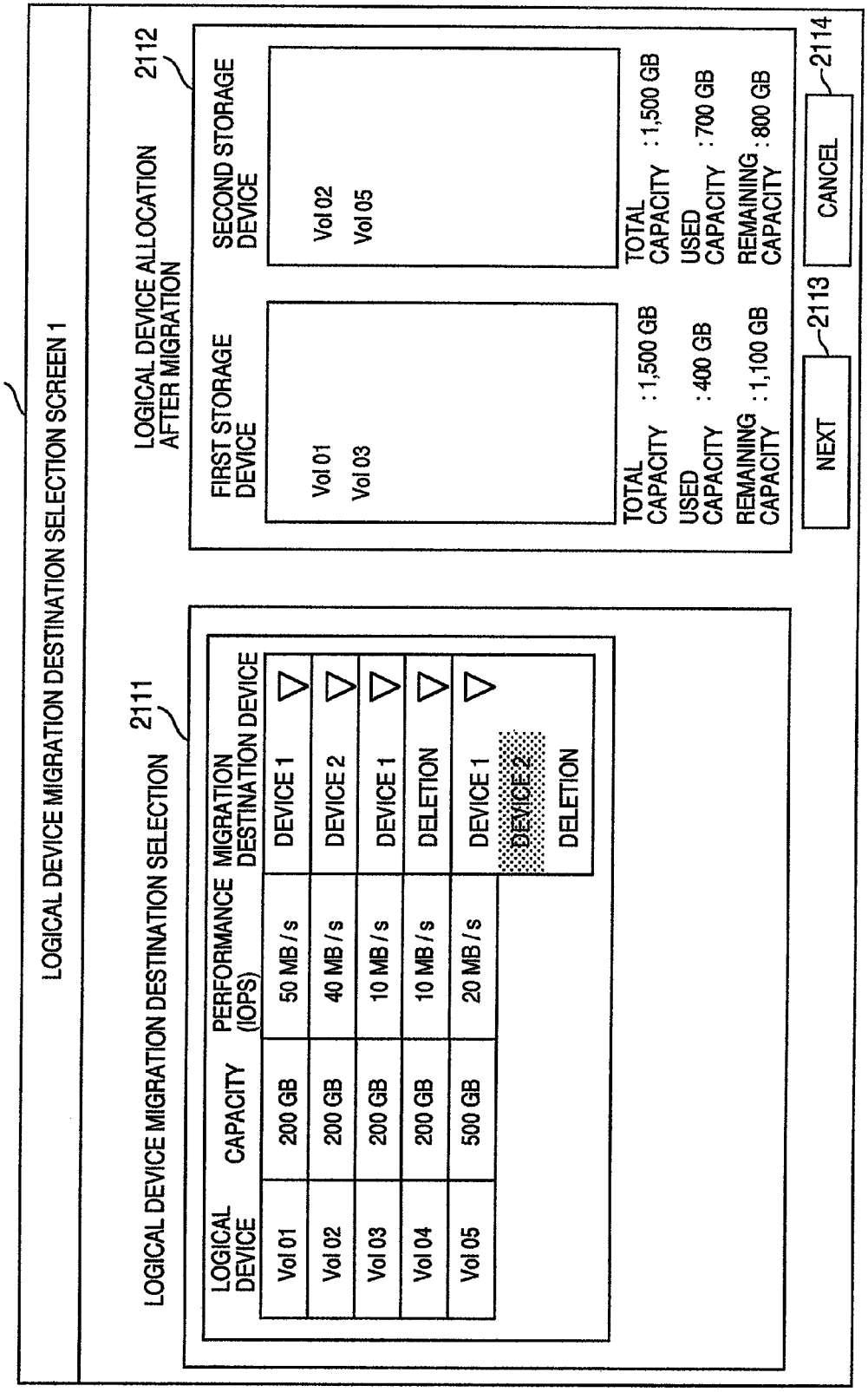
FIG. 3 is an illustrative diagram showing an example of a selection screen for a logical device migration destination.
Figure 4:
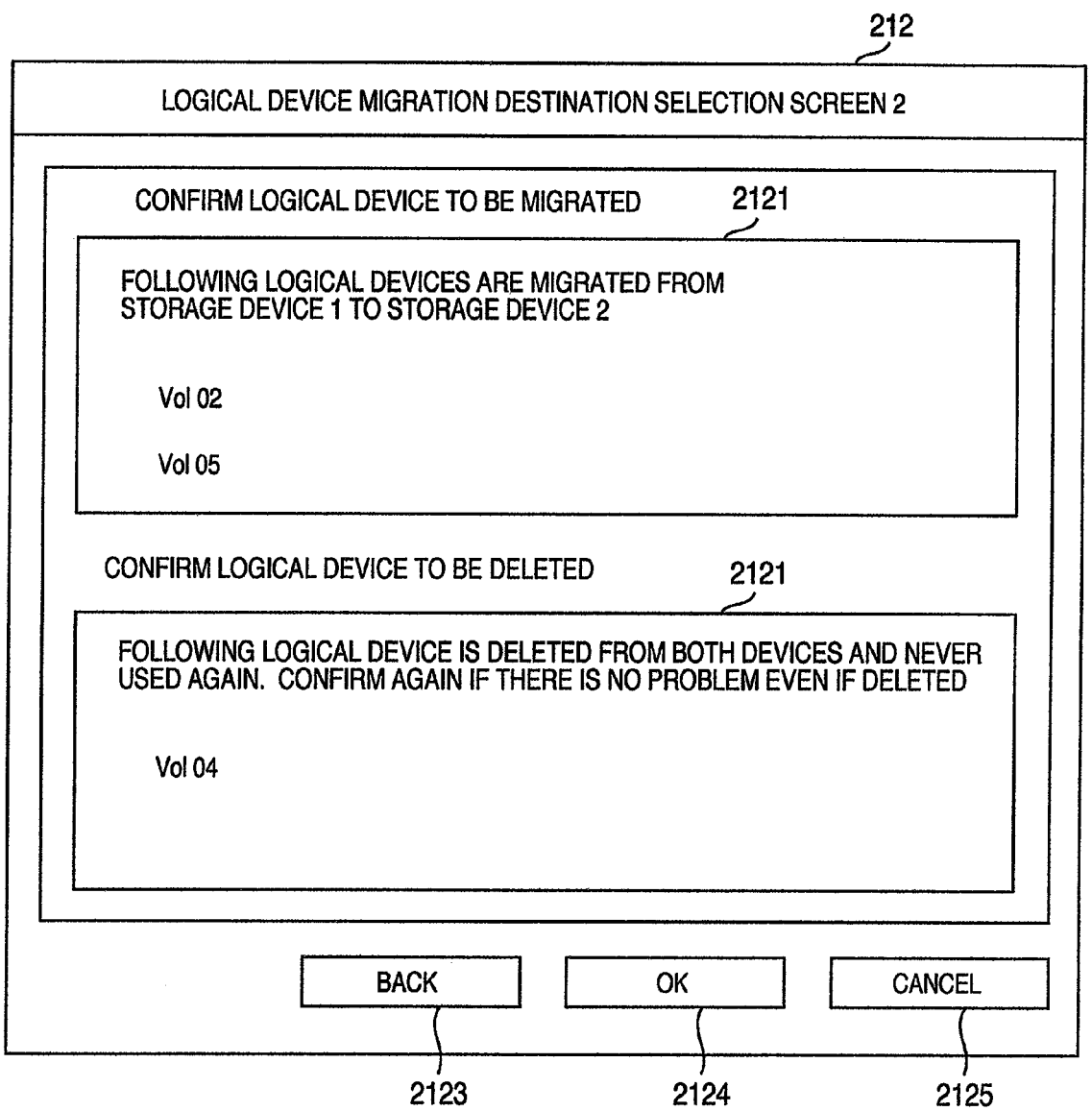
FIG. 4 is an illustrative diagram showing an example of a confirmation screen for a logical device migration destination.
Figure 8:
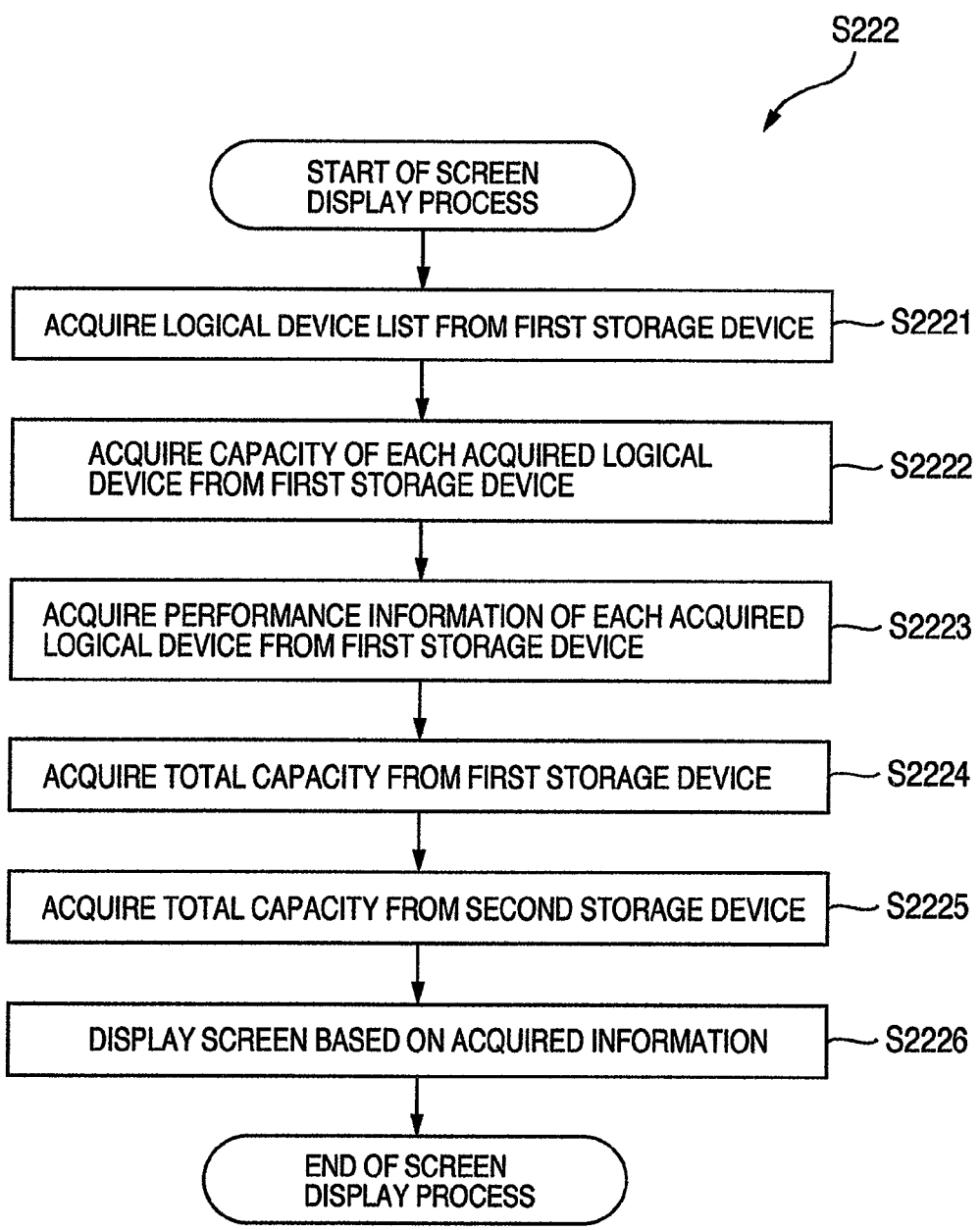
FIG. 8 is a flow chart illustrating a screen display process.

FIG. 8 is a flow chart illustrating the screen display process. In a process S2221, the screen display process S222 acquires a logical device list from the first storage device 3. Next, in a process S2222 the capacity of each acquired logical device is acquired from the first logical storage device 3. Next, in a process S2223 performance information of each acquired logical device is acquired from the first storage device 3. Next, in a process S2224 a total capacity of the first storage device 3 capable of storing data is acquired from the first storage device 3. Next, in a process S2225 a total capacity of the second storage device 4 capable of storing data is acquired from the second storage device 4. Next, in a process S2226 a logical device migration destination selection screen is displayed on the GUI screen 21. FIGS. 3 and 4 shown examples of the logical device migration destination selection screen. The screen display process S222 displays the logical device migration destination selection screen to make the administrator 8 select a logical device to be migrated from the first storage device 3 to the second storage device 4.

FIG. 3 is an illustrative diagram showing an example of the logical device migration destination selection screen. As shown in FIG. 3, when the logical device migration destination selection screen is displayed, a logical device migration destination selection screen 1 (211) is displayed. The logical device migration destination selection screen 1 (211) is constituted of a logical device migration destination selection area 2111 and a logical device allocation area 2112 after migration. The logical device list of the first storage device 3 is displayed in the logical device migration destination selection area 2111. By referring to the capacity and performance information (IOPS: Input/Output per Second), the administrator 8 selects a migration destination device from a pull-down menu of the migration destination device. In the migration destination device pull-down menu, the first storage device (device 1) and second storage device (device 2) can be selectively deleted. Specifically, in the case of a logical device Vol. 05, "device 2" is selected as the migration destination device.

When the administrator 8 selects the first storage device or second storage device, the logical device is held in the selected storage device, whereas if deletion is selected, the logical device is deleted from both the storage devices. In accordance with the selection contents by the administrator 8, a display of the logical device allocation area after migration is updated, so that it is possible to confirm how each logical device of the first storage device 3 is allocated in the first storage device 3 and second storage device 4. Specifically, as shown in the logical device migration destination selection area 2111, a logical device Vol. 01 and a logical device Vol. 03 are selected in the first storage device 3, and a logical device Vol. 02 and a logical device Vol. 05 are selected in the second storage device 4. "Deletion" is selected for a logical device Vol. 04.

In response to a depression event of a NEXT button 2113 by the administrator 8, the screen display process S222 displays the logical device migration destination selection screen 2. In response to a depression event of a CANCEL button 2114 by the administrator 8, the screen display process S222 cancels the selection contents by the administrator 8 and closes the screen. An example of the logical device migration destination selection screen 2 will be described with reference to FIG. 4.

FIG. 4 is an illustrative diagram showing an example of the logical device migration destination selection screen. The logical device migration destination selection screen 2 (212) is constituted of an area 2121 for confirming a logical device to be migrated and an area 2122 for confirming a logical device to be deleted.

By referring to the area 2121 for confirming a logical device to be migrated, the administrator 8 confirms a logical device to be migrated from the first storage device 3 to the second storage device 4. Further, by referring to the area 2122 for confirming a logical device to be deleted, the administrator 8 confirms a logical device to be deleted from both the first storage device 3 and second storage device 4.

The administrator 8 confirms the areas 2121 and 2122, and if there is no problem, depresses an OK button 2124. If there is a problem such as changing the logical device to be migrated, a BACK button 2123 is depressed to return to the logical device migration destination selection screen 1 (211) shown in FIG. 3. It is possible to cancel the contents selected by the administrator 8 and close the screen by depressing a CANCEL button 2125.

In response to a depression event of the OK button 2124 by the administrator 8 in the logical device migration destination selection screen 2 (212), the device deletion process S223 is executed. At this time, the logical device migration destination selection screen 2 (212) passes the logical device list of the first storage device 3, the logical device list of the second storage device 4 and the list of logical devices to be deleted, to the device deletion process S223. The device deletion process S223 will be described with reference to FIG. 9.

Figure 9:
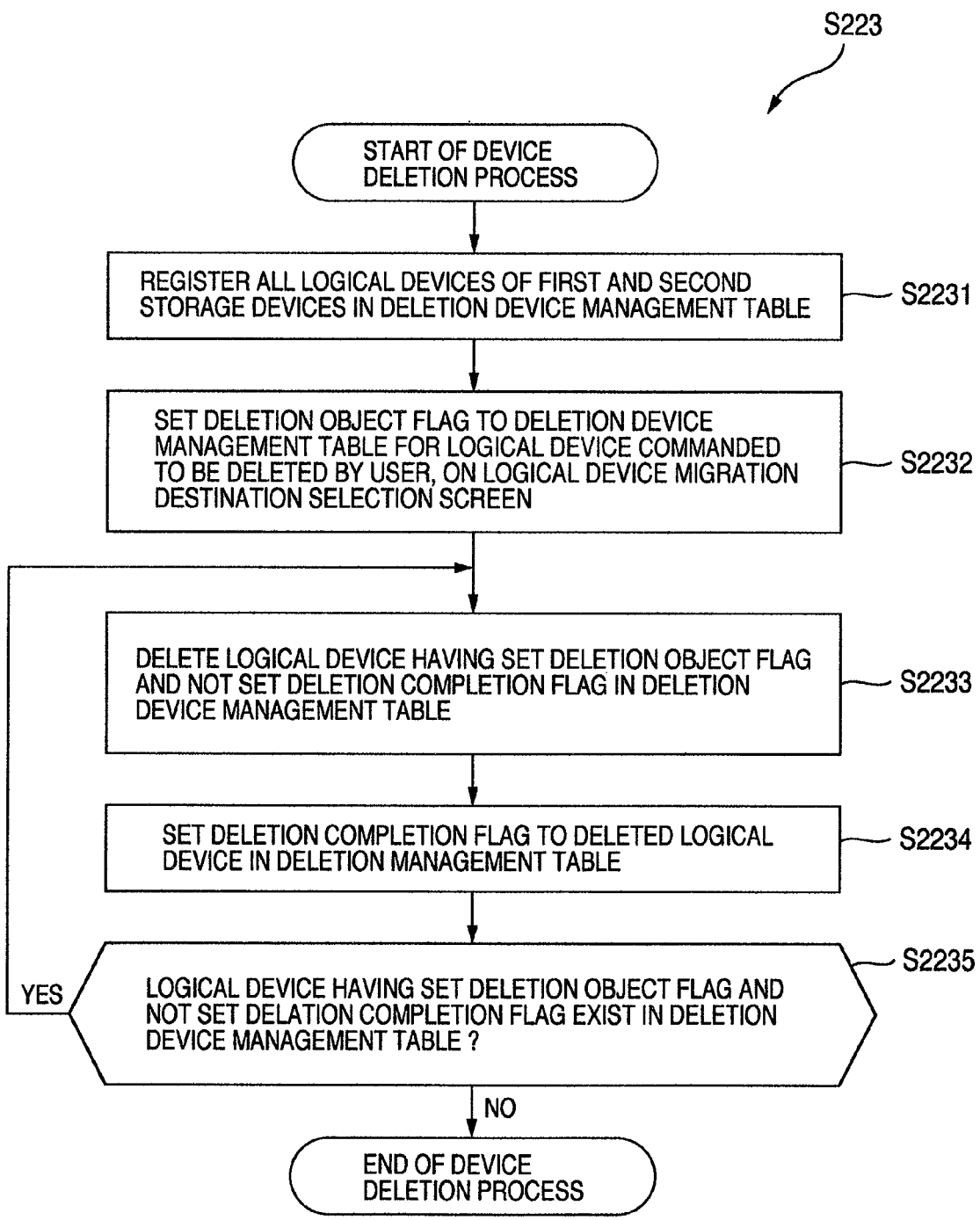
FIG. 9 is a flow chart illustrating a device deletion process.

FIG. 9 is a flow chart illustrating the device deletion process. In a process S2231, the device deletion process S223 registers the logical device list of the first storage device 3 and the logical list of the second storage device 4 in the deletion device management table 24 shown in FIG. 6. Specifically, these lists are registered in the columns of a device name 2411 and a logical device 2412 of the deletion device management table 24. Next, in a process S2232, for the list of logical devices commanded by the administrator 8 to be deleted, a flag (e.g., Yes for a deletion flag) is registered in a column of a deletion object 2413 of the deletion device management table 24. Next, in a process S2233 logical devices having a set deletion object flag in the deletion device management table 24 are sequentially deleted from the storage devices. Next, in a process S2234 a deletion completion flag (e.g., Yes for a deletion completion flag) of the deletion device management table 24 is set. Next, in a process S2235 it is checked whether there exists any logical device having a set deletion object flag and a deletion completion flag still not set (e.g., checked whether the flag is No). If there exists such a logical device (Yes in the process S2235), the processes S2233, S2234 and S2235 are executed repetitively. If there exists no such a logical device (No in the process S2235), the device deletion process S223 is terminated.

FIG. 6 is an illustrative diagram showing the deletion device management table. The deletion device management table 24 is constituted of columns of the device name 2411, a logical device 2412, a deletion object 2413 and a deletion completion 2414. Specifically, rows 2421 to 2423 indicate the states of a logical device of the first storage device 3, and rows 2424 to 2426 indicate the states of a logical device of the second storage device 4. It can be understood by referring to the row 2422 that a logical device 002 (corresponding to Vol. 02) is a logical device to be deleted and already deleted. It can be understood by referring to the row 2424 that a logical device 001 (corresponding to Vol. 01) is a logical device to be deleted but still not deleted.

Next, the migration command program 22 executes the business application control program 25. The business application control program 25 reactivates the business application 12. The business application 12 recognizes the logical devices of the first storage device 3 and the logical devices of the second storage device 4, and starts data reference and update of each logical device to resume the business.

In the embodiments including this embodiment, although one business server is used in the system, a plurality of business servers may be used in the system.

According to the data migration method of the embodiment for a computer system for managing an operation of a first storage device 3 having one or more logical devices and an operation of a business server 1 by using a management server 2, the first storage device, the business server and the storage management server being interconnected via a network, the data migration method migrating the logical device possessed by the first storage device 3 to a second storage device 4 having one or more logical devices when the second storage device is additionally installed, the data migration method comprises steps of: stopping a business application 12 on the business server 1 which accesses the first storage device 3; copying data and configuration information of all logical devices possessed by the first storage device 3, to the second storage device 4; displaying a screen for making an administrator select whether each logical device possessed by the first storage device 3 is retained in the first storage device 3 or migrated to the second storage device 4; upon reception of migration command by administrator selection, deleting data and configuration information of the logical device under the migration command, from the first storage device 3, and deleting data and configuration information of the logical device under the retention command, from the second storage device 4; and reactivating the business application 12 to allow the business application 12 to access the logical devices of the first storage device 3 and the second storage device 4.

Second Embodiment

The second embodiment of the present invention will be described with reference to FIGS. 13 to 15. The following embodiments including this embodiment correspond to modifications of the first embodiment. It takes several hours to several ten hours in some cases to copy data of the first storage device and the configuration information of logical devices to an additionally installed second storage device. Therefore, with the first embodiment method, a stop time of the business application 12 may take a long time. In the second embodiment, an on-line data sync function 35 is provided in the first storage device 3, and update data of each logical device of the first storage device 3 is reflected upon the second storage device 4 during the device copy. A feature of the second embodiment that the business application is not required to be stopped during the device copy.

Figure 13:
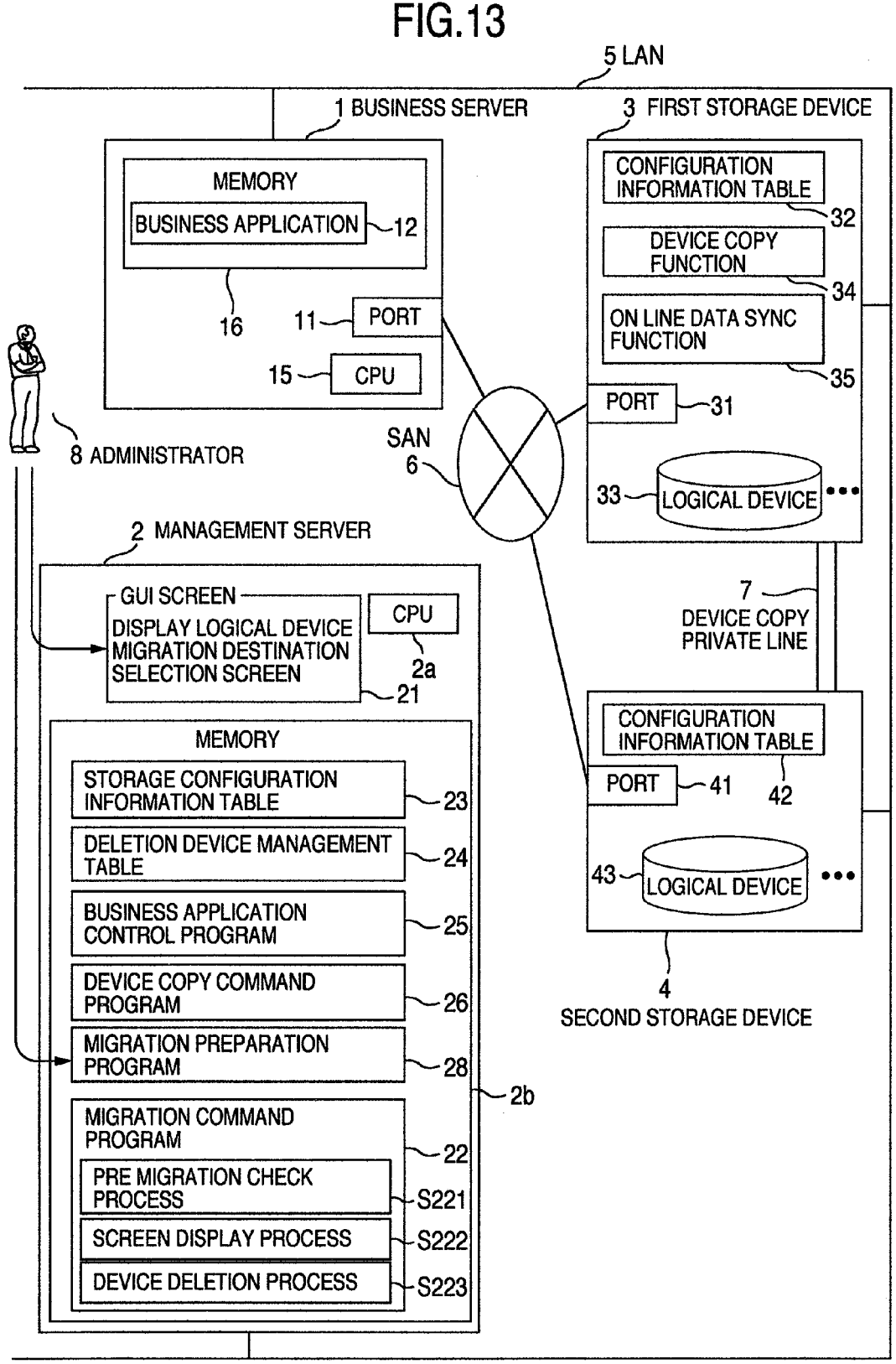
FIG. 13 is a block diagram of a storage management system according to a second embodiment.

FIG. 13 is a block diagram of a storage management system according to the second embodiment. Different points of the second embodiment from the first embodiment reside in that the on-line data sync function 35 is added to the first storage device 3 and a migration preparation program 28 is provided which has a partially different process from the migration preparation program 27. Like constituent elements to those shown in FIG. 1 are represented by identical reference numerals, and the description thereof is omitted.

Figure 14:
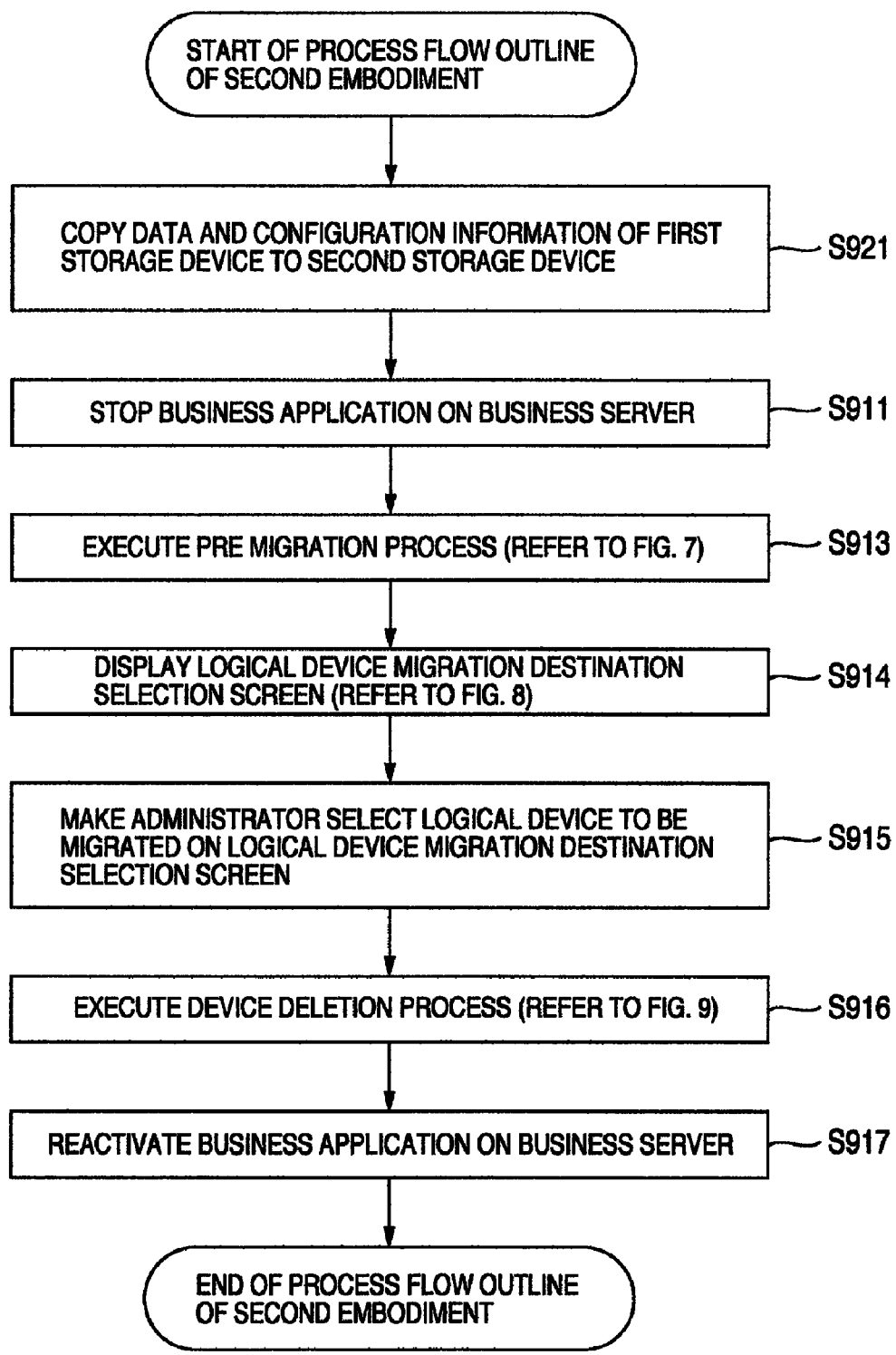
FIG. 14 is a flow chart illustrating an outline of a data migration process according to the second embodiment.

FIG. 14 is a flow chart illustrating the outline of a data migration process according to the second embodiment. Description will be made by referring to FIG. 13 when necessary. In this embodiment, in a process S921 the migration preparation program 28 executed upon command by the administrator 8 executes the device copy command program 26. The executed device copy command program 26 copies data and configuration information of the first storage device 3 to the second storage device 4. The process S921 is executed by the device copy command program 26 and device copy function 34 shown in FIG. 13.

Next, in a process S911 the migration preparation program 28 (refer to FIG. 15) executes the business application control program 25. The executed business application control program 25 stops the business application 12 on the business server 1. The processes to follow are similar to the processes S913 to S917 of the process flow outline of the first embodiment shown in FIG. 2. The process flow outline of the second embodiment has been described above.

Figure 15:
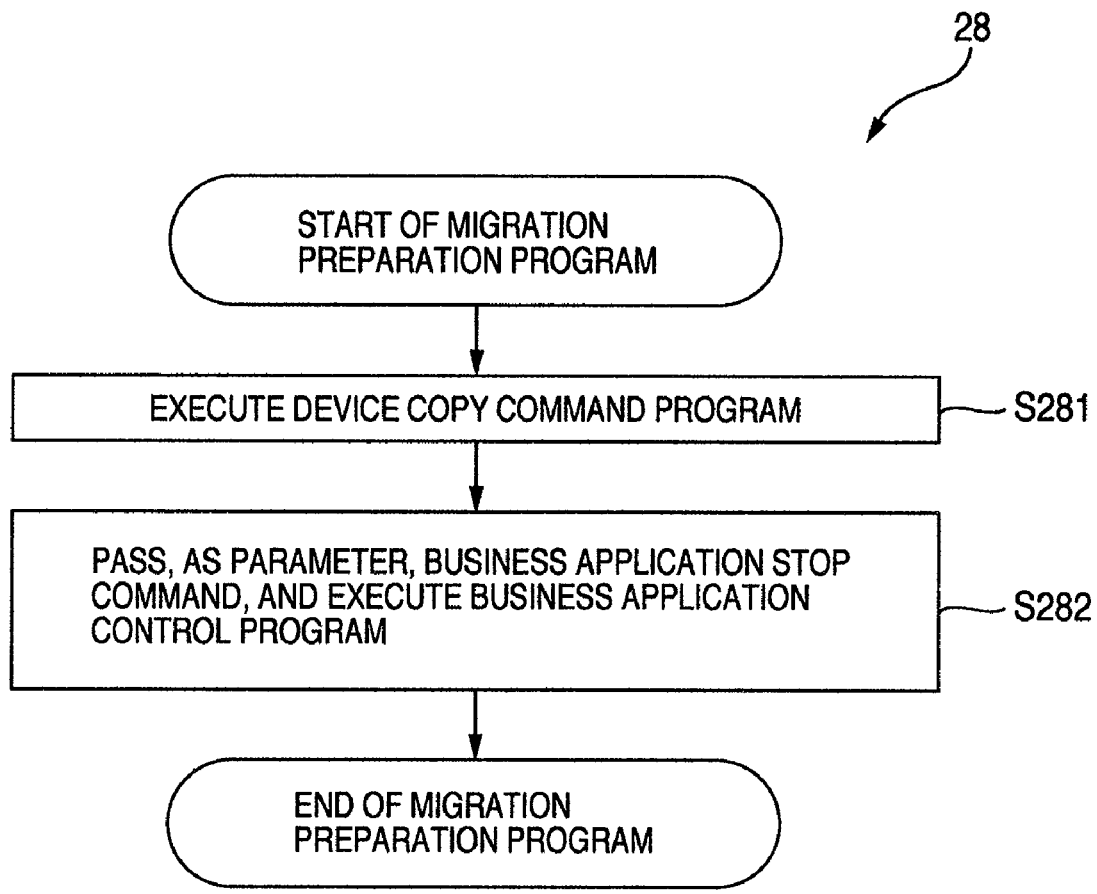
FIG. 15 is a flow chart illustrating a process to be executed by a migration preparation program.

With reference to FIGS. 13 and 15, description will be made on different processes of the second embodiment from those of the first embodiment. First, the migration preparation program 28 is executed upon command by the administrator 8. With reference to the process flow shown in FIG. 15, the migration preparation program 28 will be described.

FIG. 15 is a flow chart illustrating a process to be executed by the migration preparation program. First, in a process S281 the migration preparation program 28 executes the device copy command program 26. The process to be executed by the device copy command program 26 is similar to the first embodiment. During execution of the process S281, even if data of the logical device 33 is changed by an access from the business application 12, this change is reflected upon the logical devise 43 of the second storage device 4 by the on-line data sync function 35.

Next, in a process S282 the migration preparation program 28 passes, as a parameter, business application stop command to thereby execute the business application control program 25. The process to be executed by the business application control program 25 is similar to the first embodiment.

In this case, although the configuration information table 32 and logical device 33 are copied to the second storage device 4 by using the function of hardware of the first storage device 3, the management server may read the configuration information table 32 and logical device 33 from the first storage device 3, and copy the configuration information table 32 and logical device 33 to the second storage device 4 to thereby retain data sync, without involving the hardware function. The processes to follow are similar to execution of the migration command program 22 and the like of the first embodiment.

According to the data migration method of this embodiment for a computer system for managing an operation of a first storage device 3 having one or more logical devices and an on-line data sync unit and an operation of a business server 1 by using a storage management server, the first storage device, the business server and the storage management server being interconnected via a network, the data migration method migrating the logical device possessed by the first storage device 3 to a second storage device 4 having one or more logical devices when the second storage device is additionally installed, the data migration method comprising steps of: copying data and configuration information of all logical devices possessed by the first storage device 3, to the second storage device 4, by using the on-line data sync unit; stopping the business application 12 on the business server 1 which accesses the first storage device 3; displaying a screen for making an administrator select whether each logical device possessed by the first storage device 3 is retained in the first storage device 3 or migrated to the second storage device 4; upon reception of migration command by administrator selection, deleting data and the configuration information of the logical device under migration command from the first storage device 3, and deleting data and the configuration information of the logical device under retention command from the second storage device 4; and reactivating the business application 12 to allow the business application 12 to access the logical devices of the first storage device 3 and the second storage device 4.

Third Embodiment

The third embodiment of the present invention will be described with reference to FIGS. 16 to 22. This embodiment corresponds to a modification of the second embodiment. In the second embodiment method, it is necessary to stop the business application 12 while data migration is performed. In the third embodiment, a device management program 13 is prepared on the business server 1 so that it is possible to dynamically change over the logical device to be accessed by the business application, during data migration. Data migration can be performed without stopping the business application 12. The feature of this embodiment resides in that data migration can be performed without stopping the business application 12.

Figure 16:
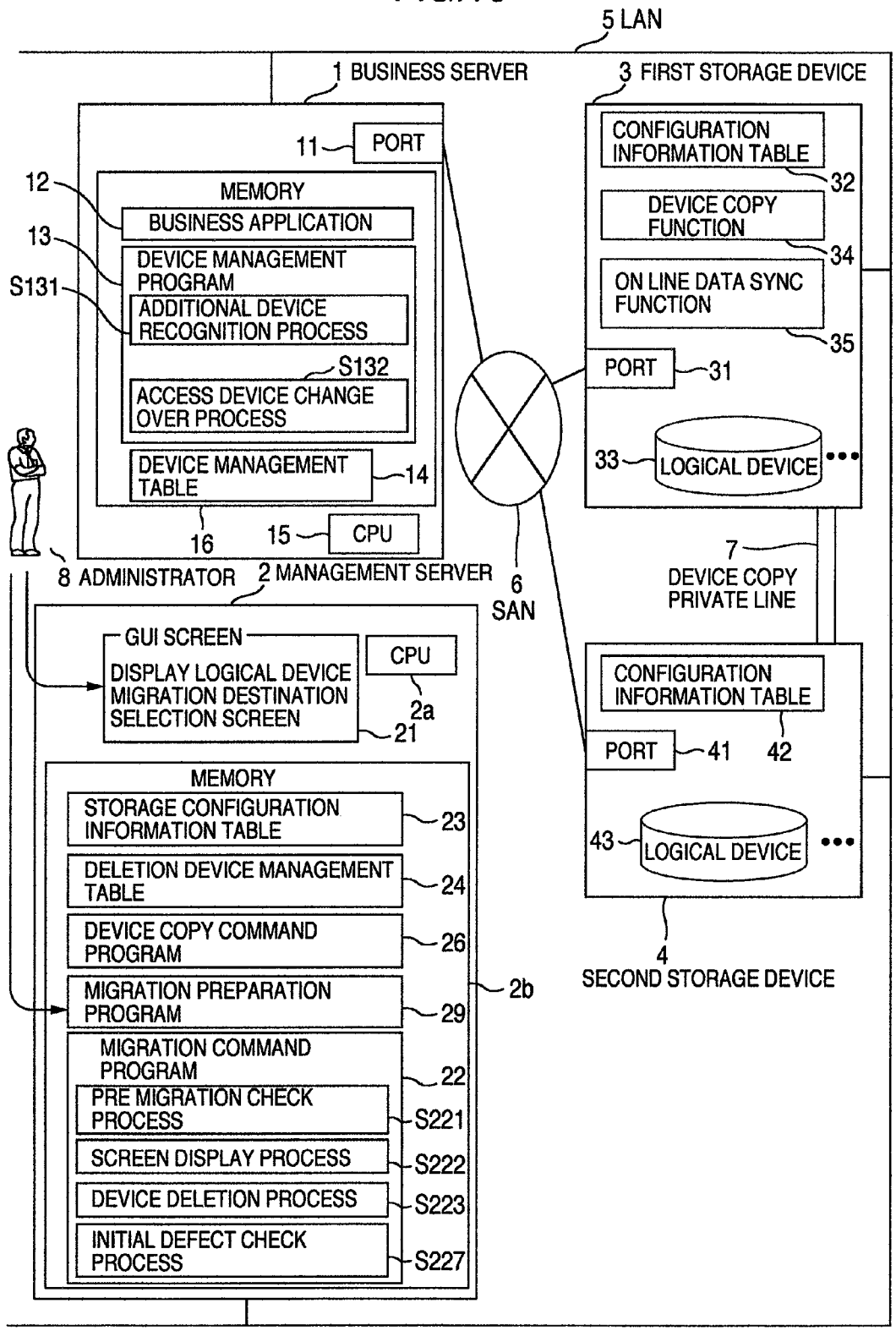
FIG. 16 is a block diagram of a storage management system according to a third embodiment.

FIG. 16 is a block diagram showing a storage management system according to the third embodiment. Different points of this embodiment from the second embodiment reside in that a device management program 13 and a device management table 14 are added to the business server 1 and the business application control program 25 is deleted from the management server 2. The migration preparation program 27 is partially modified to form a migration preparation program 29. An initial defect check process S227 is provided in the migration command program 22. Like constituent elements to those shown in FIG. 13 are represented by identical reference numerals, and the description thereof is omitted.

Figure 17:
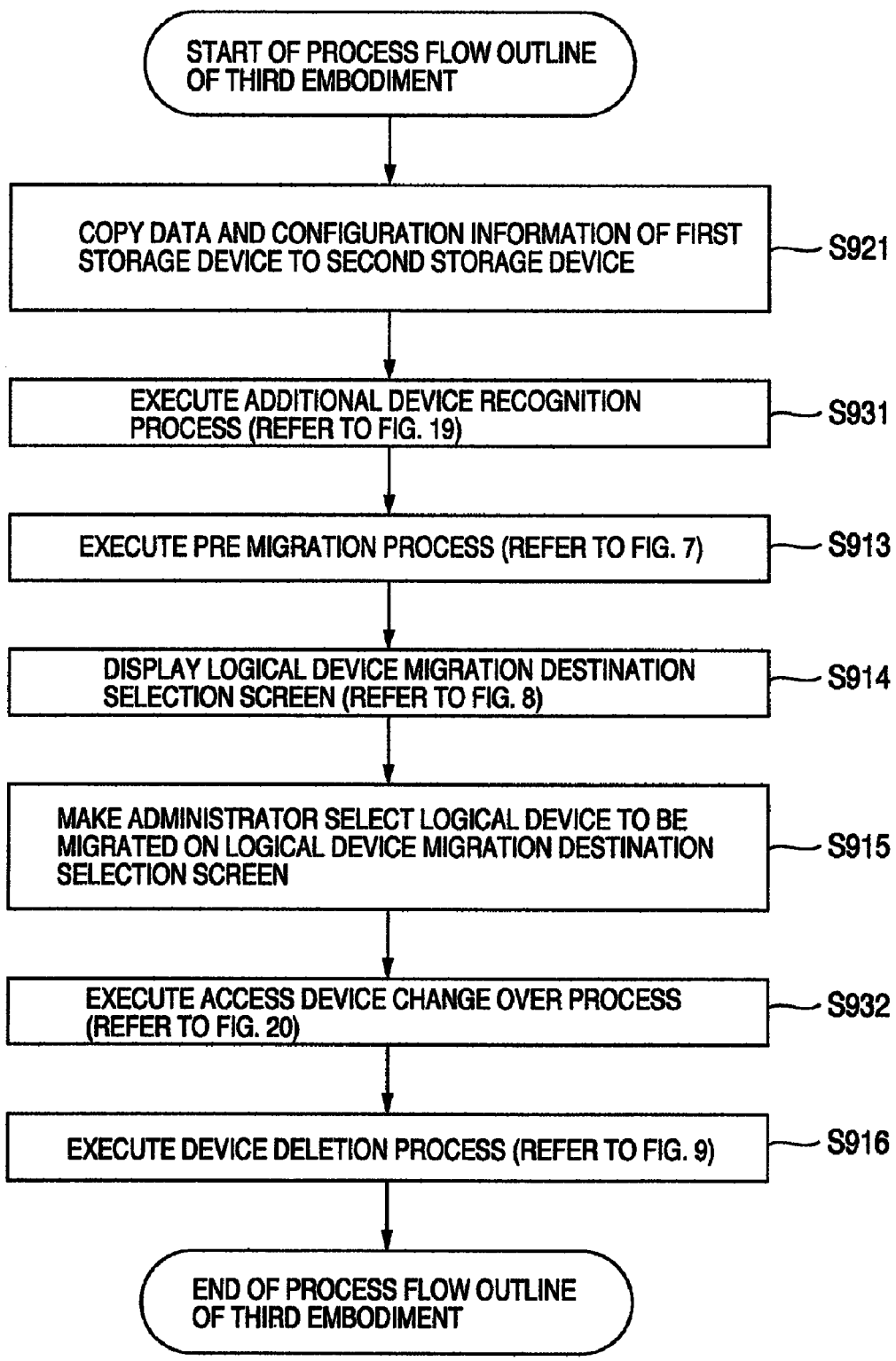
FIG. 17 is a flow chart illustrating a data migration process according to the third embodiment.

FIG. 17 is a flow chart illustrating the data migration process according to the third embodiment. Description will be made by referring to FIG. 16 when necessary. In this embodiment, in a process S921 the configuration information and data of the first storage device 3 are copied to the second storage device 4 to thereafter advance to the next process. A process S921 is similar to the second embodiment.

Upon reception of a copy completion notice, in a process S931 an additional device recognition process S131 on the business server 1 recognizes the logical devices of the second storage device to effect restrictions that the business application 12 cannot access the logical devices on the second storage device, to thereafter advance to the next process.

In a process S913 it is checked whether data of the first storage device 3 can be migrated to the second storage device 4 to thereafter advance to the next process. The process S913 is similar to the first embodiment.

In a process S914 a logical device migration selection screen is displayed to thereafter advance to the next process. The process S914 is similar to the first embodiment.

In a process S915 the administrator 8 is made to select a logical device to be migrated from the first storage device 3 to the second storage device 4, and the migration command program 22 receives as an input parameter a list of selected logical devices to thereafter advance to the next process. The process S915 is similar to the first embodiment.

In a process S932 the migration command program 22 passes as an input parameter the list of selected logical devices to an access device change-over process S132. The access device change-over process S132 effects restrictions that the business application 12 cannot access the deletion commanded logical devices, to thereafter advance to the next process. The process S932 is performed by the migration command program 22 and access device change-over process S132 shown in FIG. 16.

In a process S916 the logical device and its configuration information are deleted from the first storage device 3 and second storage device 4 to thereafter terminate a series of processes. The process S916 is similar to the first embodiment. The outline of the process flow of the third embodiment has been described above.

With reference to FIG. 16 and FIGS. 18 to 21, description will be made on different processes of this embodiment from the second embodiment. The migration preparation program 29 executes a process S281 in accordance with an instruction of the administrator 8. The process S281 is similar to the second embodiment. The migration preparation program 29 will be explained with reference to FIG. 21.

Figure 21:
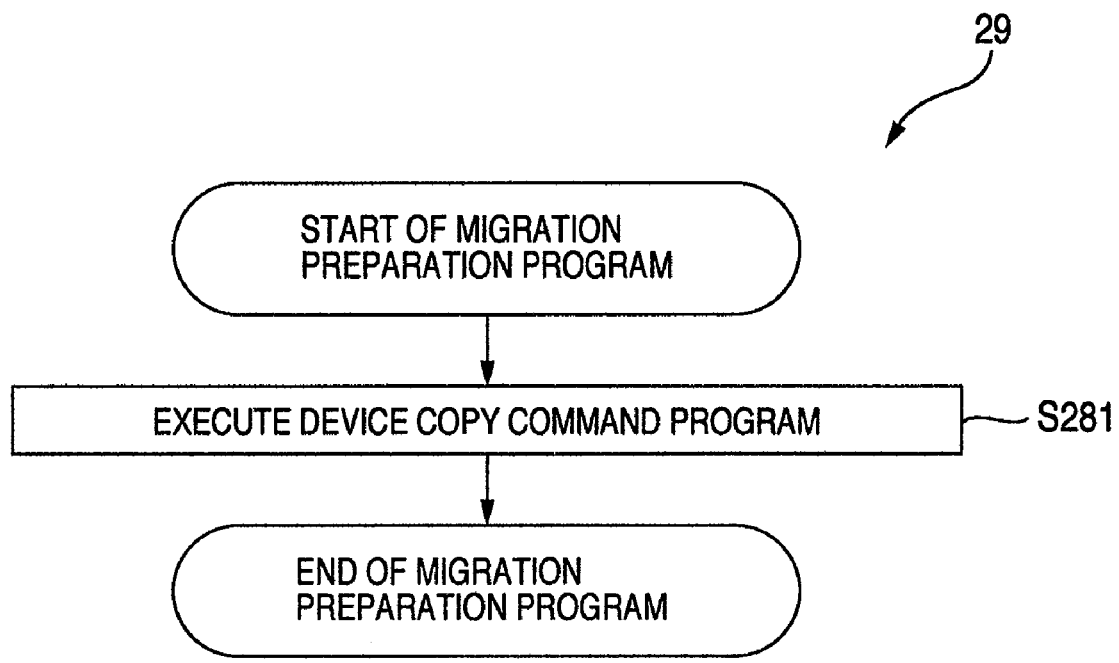
FIG. 21 is a flow chart illustrating a process to be executed by a migration preparation program.

FIG. 21 shows a flow chart illustrating a process of a migration preparation program. The migration program 29 executes a process S2381. After completion of the process S2381, the migration preparation program 29 is terminated.

After the process of the migration preparation program 29 is completed and at the same when the business server 1 is allowed to access the logical device 43 of the second storage device 4, the device management program 13 is executed to perform an additional device recognition process S131. The additional device recognition process S131 will be described with reference to FIG. 19.

Figure 18:
FIG. 18 is an illustrative diagram showing a device management table.
Figure 19:
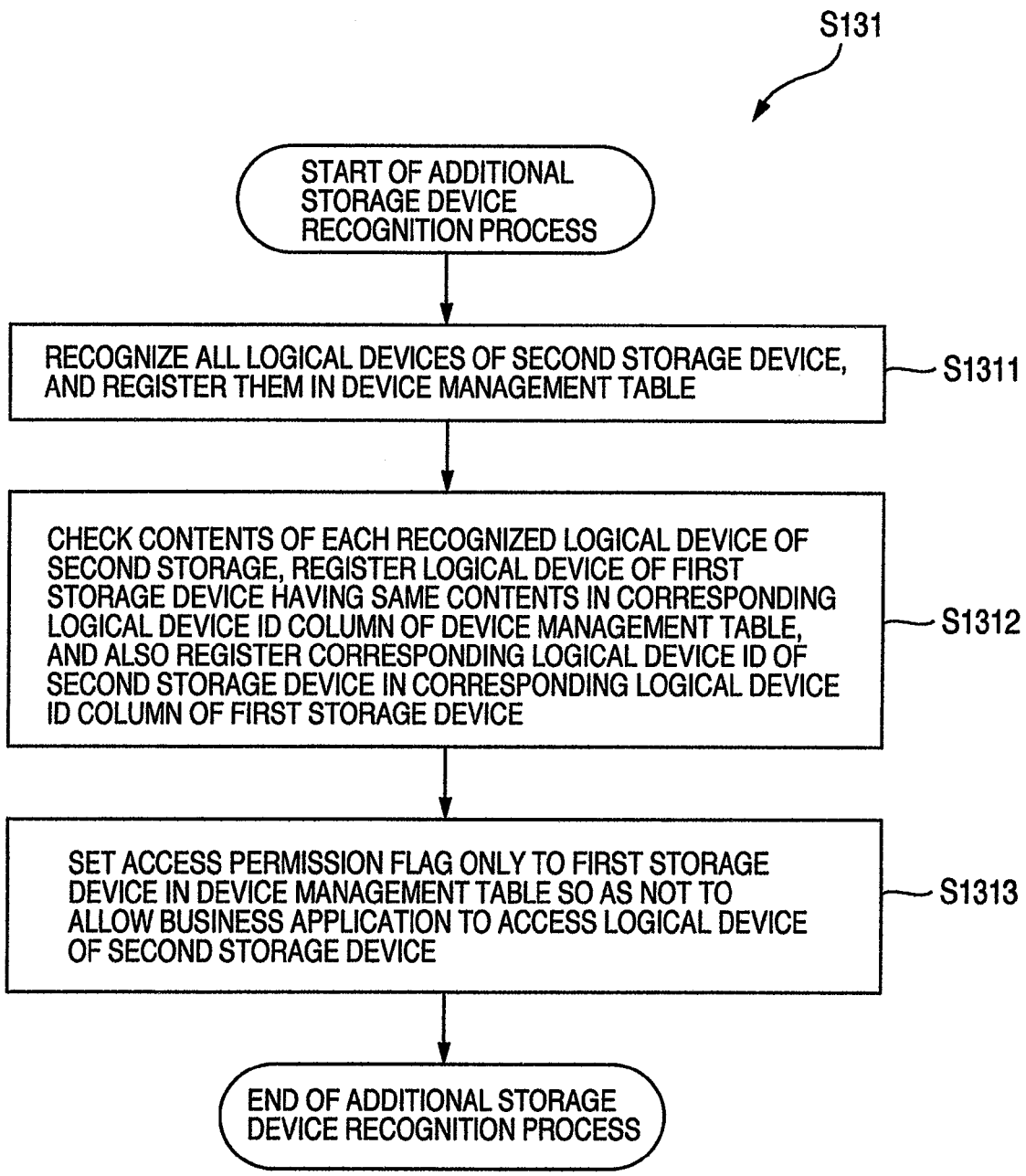
FIG. 19 is a flow chart illustrating an additional device recognition process.

FIG. 19 is a flow chart illustrating the additional device recognition process. In a process S1311 the additional device recognition process S131 recognizes all logical devices of the second storage device 4 and registers all the logical devices in a device management table 14. FIG. 18 shows the device management table 14. Registered in the process S1311 are columns of an ID (1411), a device name (1412) and an LUN (1413) of each logical device in the device management table 14, to thereafter advance to the next process.

A process S1312 checks the contents of each recognized logical device of the second storage device 4. An ID of a logical device of the first storage device 3 having the same contents is registered in a column of a corresponding logical device ID (1414) of a device management table, and an ID of the corresponding logical device of the second storage device is also registered in a column of the corresponding logical device ID (1414) of the first storage device. And it advances to the next process.

A method of checking a logical device in the process S1312 includes a method by which all bits of each of all logical devices registered in the device management table 14 are compared, a method by which an identifier for identifying each logical device is compared, the identifier being stored in a specific data field of each logical device, and other methods. Alternatively, a method may be considered by which a logical device is registered in a corresponding logical device ID column in accordance with the configuration information of the first storage device 3 and second storage device 4, without checking the contents of each logical device.

In a process S1313 an access permission flag is set only to the first storage device in the device management table 14 so that the business application 12 cannot access each logical device of the second storage device 4. "Permission" is set to a permission flag 1415 in FIG. 18.

FIG. 18 is an illustrative diagram of the device management table. The device management table 14 is constituted of columns of a logical device ID (1411), a device name (1412), a logical unit (LUN) (1413), a corresponding logical device ID (1414) and an access permission (1415) from the business application. Specifically, after the additional device recognition process S131 shown in FIG. 19, the logical device ID001 of the first storage device at a row 1421 corresponds to the logical device ID004 of the second storage device. "Permission" is set to the permission flag for the business application 12. Rows 1422 and 1423 are similar to the row 1421. The logical device ID004 of the second storage device at a row 1424 corresponds to the logical device ID001 of the first storage device, and "inhibition" is set to the permission flag for the business application 12. Rows 1425 and 1426 are similar to the row 1424.

Next, the administrator 8 executes the migration command program 22. Before this and at this timing, whether the second storage device 4 has an initial defect may be confirmed, by operating the second storage device 4 by synchronizing data of the first storage device 3 and second storage device 4.

Figure 22:
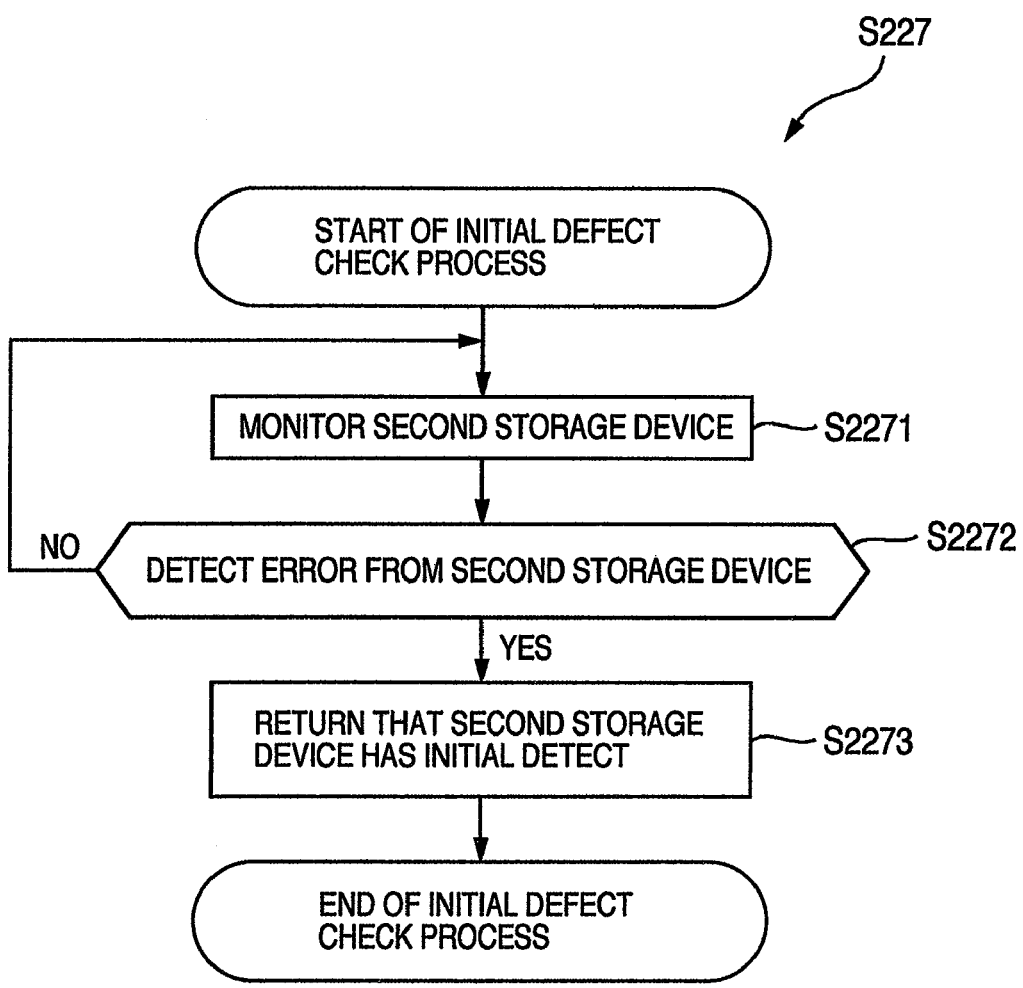
FIG. 22 is a flow chart illustrating an initial defect check process.

In order to confirm whether there is an initial defect, the migration preparation program 29 executes an initial defect check process S227 before the program is terminated. With reference to FIG. 22, the initial defect check process S227 will be described.

FIG. 22 is a flow chart illustrating the initial defect check process. In a process S2271 the initial defect check process S227 monitors the second storage device 4. Next, in a process S2272 it is checked whether any error occurs in the second storage device 4. If an error is detected (Yes in the process S2272), in a process S2273 an occurrence of the error is returned to the second storage device 4 to thereafter terminate the initial defect check process S227. If an error is not detected (No in the process S2272), the processes S2271 and S2272 are executed again to continue monitoring whether there is any initial defect during a predetermined period.

Upon termination of the additional device recognition process S131, the migration command program 22 is executed. Operations by the administrator 8 for the pre-migration check process S221 and screen display process S222 and for the screen displayed by the screen display process S22 of the migration command program 22, are similar to the first and second embodiments. In the first and second embodiment, the device deletion process S223 is called after the screen display process S222 is executed, whereas in this embodiment, an access device change-over process S132 is executed after the screen display process S222 is executed.

Figure 20:
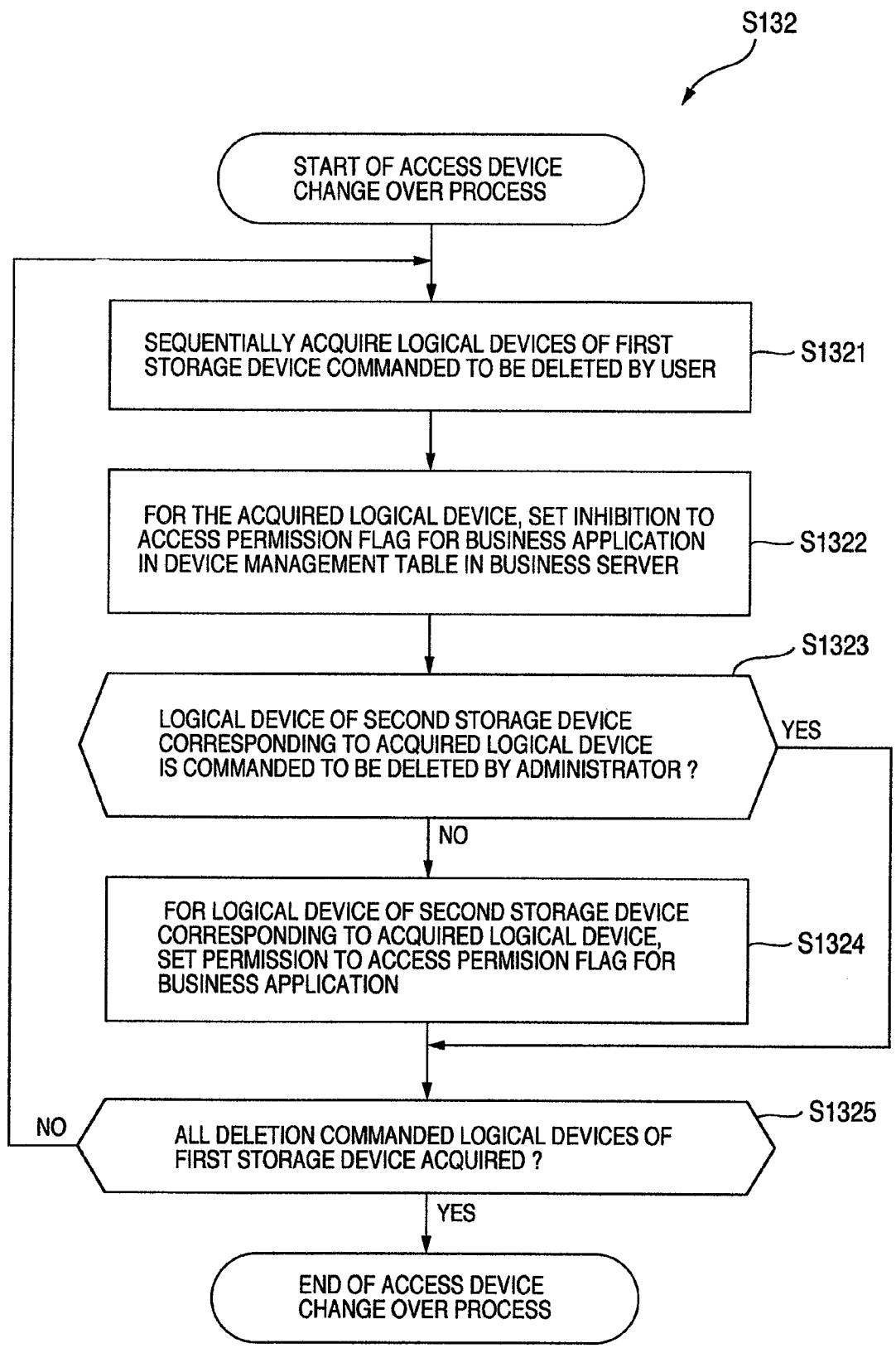
FIG. 20 is a flow chart illustrating an access device changeover process.

FIG. 20 is a flow chart illustrating the access device change-over process. In a process S1321 the access device change-over process S132 sequentially acquires logical devices of the first storage device 3 commanded to be deleted by the administrator 8, to thereafter advance to the next process.

In a process S1322 for each acquired logical device, the access permission flag for the business application in the device management table on the business server is inhibited. Next, in a process S1323 for each acquired logical device, it is checked whether the logical device commanded in the corresponding logical device ID in the device management table 14 is commanded by the administrator 8 to be deleted. If not commanded (No in the process S1323), in a process S1324 for the acquired logical device, the access permission flag of the logical device commanded in the corresponding logical device ID in the device management table 14 is set as "permission", to thereafter advance to the next process. If the logical device is commanded to be deleted in the process S1323 (Yes in the process S1323), the process advances to a process S1325.

In the process S1325 it is judged whether all deletion commanded logical devices of the first storage device 3 are acquired. If all are not acquired (No in the process S1325), the processes S1321 to S1324 are executed repetitively for all deletion commanded logical devices of the first storage device 3. If all are acquired (Yes in the process S1325), the access device change-over process S132 is terminated. After completion of the access device change-over process S132, a device deletion process S223 is executed. The device deletion process S223 is similar to the first embodiment.

In the first and second embodiments, the business application 12 is reactivated after the completion of the device deletion process S223, whereas in the third embodiment, the business application is not required to be reactivated because the business application 12 is not stopped.

According to the data migration method of this embodiment for a computer system for managing an operation of a first storage device 3 having one or more logical devices and an on-line data sync unit and an operation of a business server 1 by using a management server 2, the first storage device, the business server and the storage management server being interconnected via a network, the data migration method migrating the logical device possessed by the first storage device 3 to a second storage device 4 having one or more logical devices when the second storage device is additionally installed, the data migration method comprising steps of: copying data and configuration information of all logical devices possessed by the first storage device 3, to the second storage device 4, by using the on-line data sync unit; restricting the business application 12 on the business server 1 so as not to access the logical device possessed by the second storage device 4; displaying a screen for making an administrator select whether each logical device possessed by the first storage device 3 is retained in the first storage device 3 or migrated to the second storage device 4; upon reception of migration command by administrator selection, restricting the business application 12 on the business server 1 so as not to access the logical device under migration command of the first storage device 3, and allowing the application to access the logical device under migration command of the second storage device 4; and deleting data and the configuration information of the logical device under migration command from the first storage device 3, and deleting data and the configuration information of the logical device under retention command from the second storage device 4.

According to the data migration method of this embodiment for a computer system for managing an operation of a first storage device 3 having one or more logical devices and an on-line data sync unit and an operation of a business server 1 by using a management server 2, the first storage device, the business server and the storage management server being interconnected via a network, the data migration method migrating the logical device possessed by the first storage device 3 to a second storage device 4 having one or more logical devices when the second storage device is additionally installed, the data migration method comprising steps of: copying data and configuration information of all logical devices possessed by the first storage device 3, to the second storage device 4, by using the on-line data sync unit; restricting the business application 12 on the business server so as not to access the logical device possessed by the second storage device 4; synchronizing data of the first storage device 3 and the second storage device 4 during a predetermined period, and confirming that an initial defect dose not exist in the second storage device; displaying a screen for making an administrator select whether each logical device possessed by the first storage device 3 is retained in the first storage device 3 or migrated to the second storage device 4; upon reception of migration command by administrator selection, restricting the business application 12 on the business server 1 so as not to access the logical device under migration command of the first storage device 3, and allowing the business application 12 to access the logical device under migration command of the second storage device 4; and deleting data and configuration information of the logical device under the migration command, from the first storage device 3, and deleting data and configuration information of the logical device under the retention command, from the second storage device 4.

Fourth Embodiment

Figure 23:
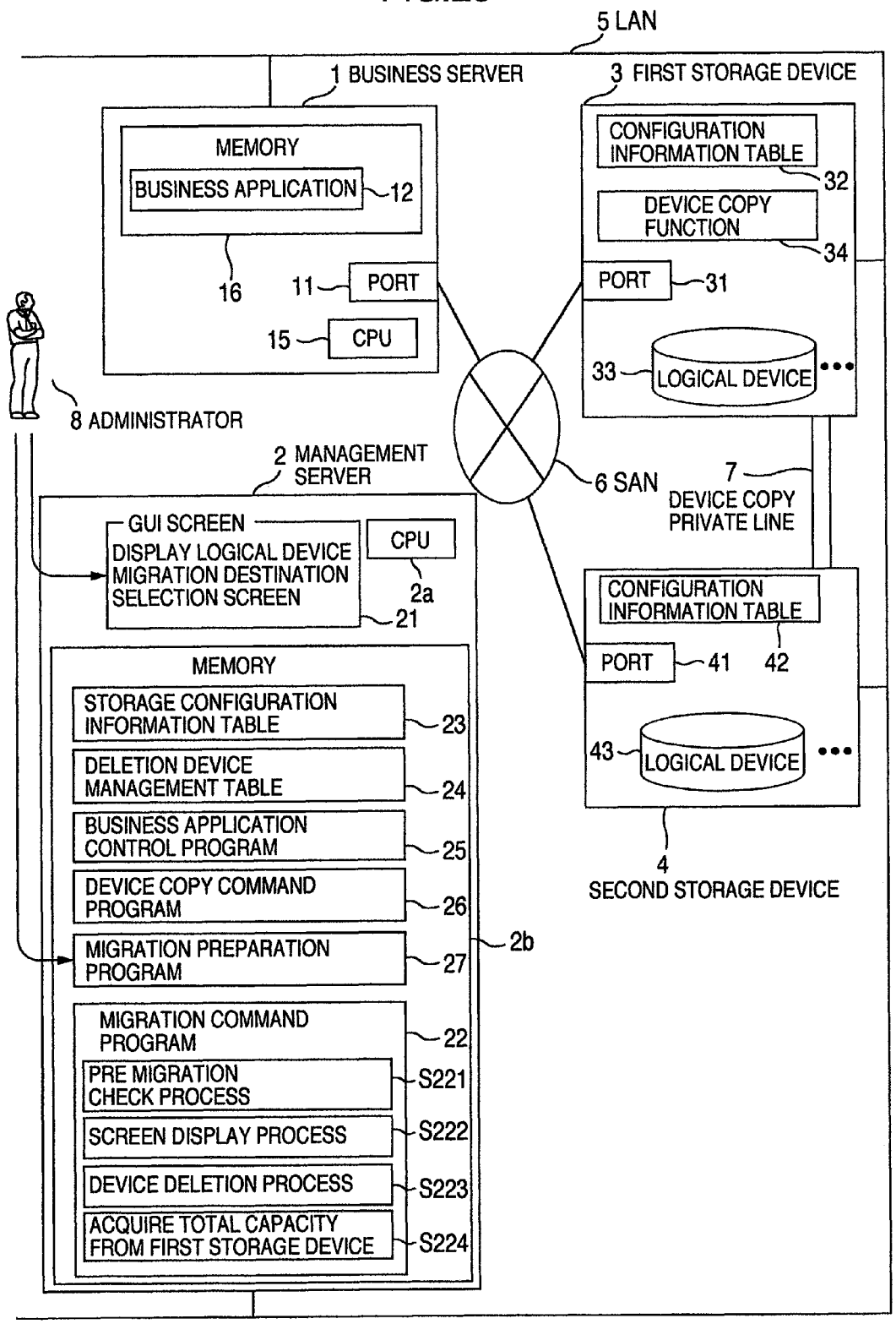
FIG. 23 is a block diagram of a storage management system according to a fourth embodiment.
Figure 24:
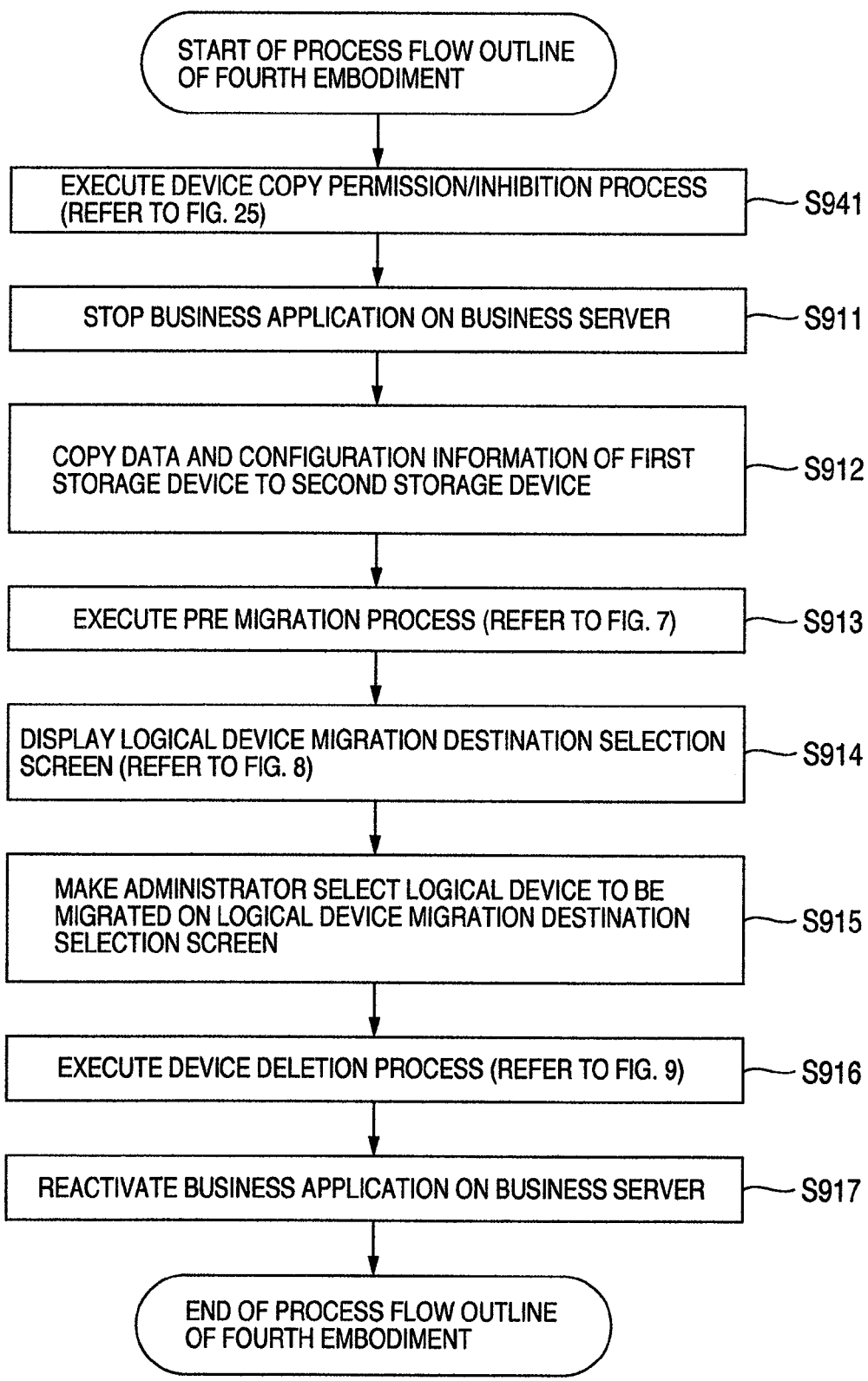
FIG. 24 is a flow chart illustrating an outline of a data migration process according to the fourth embodiment.
Figure 25:
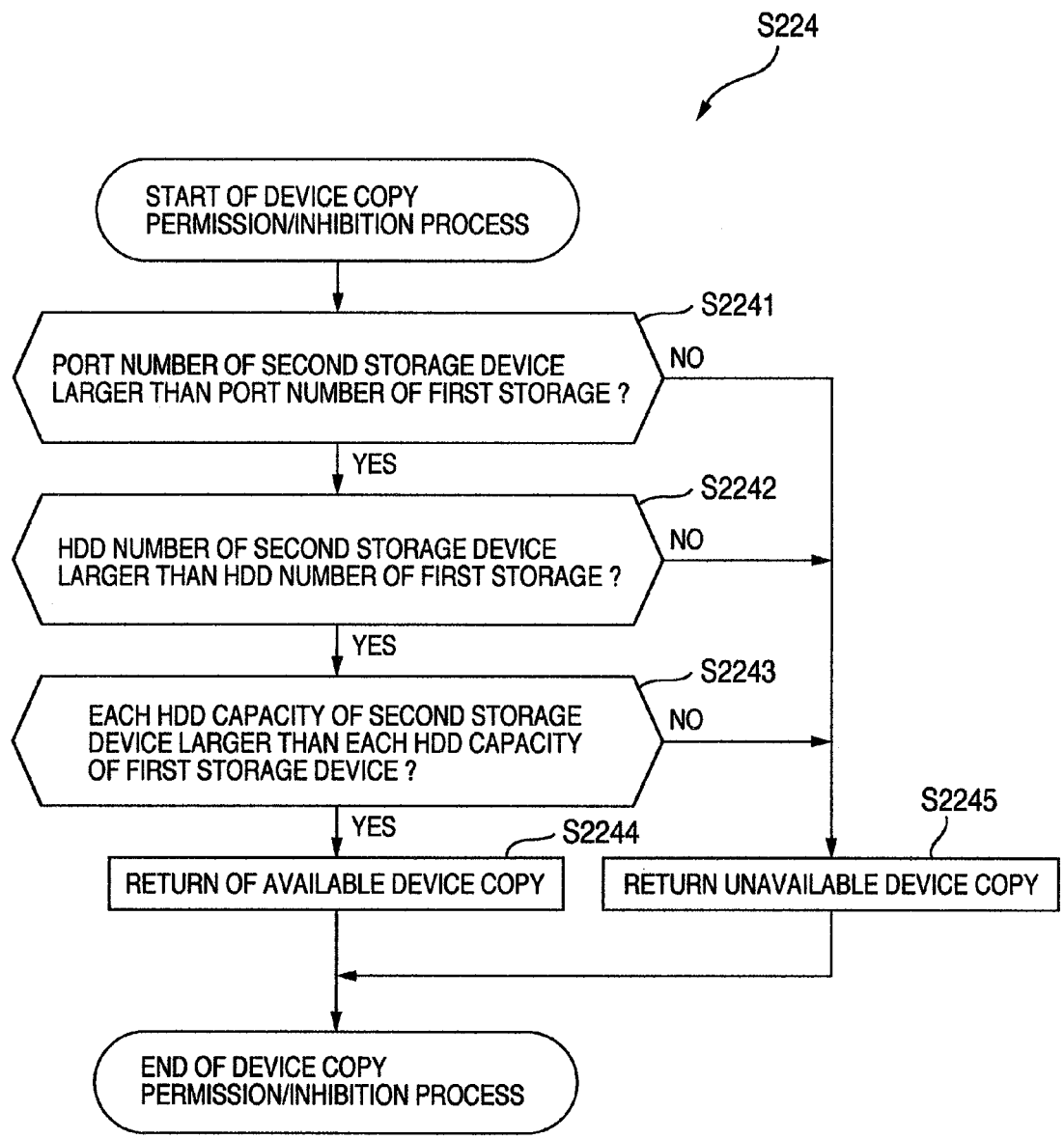
FIG. 25 is a flow chart illustrating a device copy permission/inhibition judgment process.

With reference to FIGS. 23 to 25, the fourth embodiment of the present invention will be described. This embodiment corresponds to a modification of the first to third embodiments. A feature of this embodiment resides in that since the migration command program 22 has a device copy permission/inhibition judge process S224, the second storage device 4 is not required to be the same type as that of the first storage device 3.

FIG. 23 is a block diagram showing a storage management system according to the fourth embodiment. A different point of this embodiment from the first embodiment is that the device copy permission/inhibition judge process S224 is added to the migration command program 22. Like constituent elements to those shown in FIG. 1 are represented by identical reference numerals, and the description thereof is omitted.

FIG. 24 is a flow chart illustrating the outline of a data migration process according to the fourth embodiment. Description will be made by referring to FIG. 23 when necessary. In this embodiment, in a process S941 the hardware structures are compared between the first storage device 3 and second storage device 4, to thereby judge whether the configuration information table 32 and logical device 33 of the first storage device 3 can be copied to the second storage device 4. The process S941 is executed by the device copy permission/inhibition judge process S224 (refer to FIG. 25), to thereafter advance to the processes to follow. Processes S911 to S917 are similar to the processes S911 to S917 of the process flow outline of the first embodiment shown in FIG. 2. The outline of the process flow of the fourth embodiment has been described above.

Different processes of this embodiment from those of the first embodiment will be described with reference to FIGS. 23 and 25. First, the administrator 8 executes the device copy permission/inhibition judge process S224. The device copy permission/inhibition judge process S224 will be described with reference to FIG. 25.

FIG. 25 is a flow chart illustrating the device copy permission/inhibition judge process. In a process S2241 the device copy permission/inhibition judge process S224 checks whether the number of ports of the second storage device 4 is larger than the number of ports of the first storage device 3. If larger (Yes in the process S2241), in a process S2242 it is checked whether the number of hard disks (HDDs) of the second storage device 4 is larger than the number of HDDs of the first storage device 3. If larger (Yes in the process S2242), it is checked whether the capacity of each HDD of the second storage device 4 is larger than the capacity of each HDD Of the third storage device 3. If larger (Yes in the process S2243), the process advances to a process S2244. Namely, if the checks in the processes S2241 to S2243 indicate that the number of ports, the number of HDDs and the capacity of each HDD of the second storage device 4 are larger than those of the first storage device 3, in the process S2244 that a device can be copied is returned, to thereafter terminate the device copy permission/inhibition judge process S224. If the checks in the processes S2241 to S2243 indicate that the number of ports of the second storage device 4 is smaller (No in the process 2241), and that the number of HDDs is smaller (No in the process S2242) and the capacity of each HDD is smaller than that of each HDD of the first storage device 3 (No in the process S2243), then a process S2245 is executed. In the process S2245 that the device cannot be copied is returned to thereafter terminate the device copy permission/inhibition judge process S224.

If the device cannot be copied, the device copy permission/inhibition judge process S224 is terminated abnormally, to intercept the migration process. If the device can be copied, the processes to follow are similar to execution of the migration preparation program 27 and the like of the first embodiment.

According to the data migration method of this embodiment, the storage management server 2 compares the hardware structures of the first storage device 3 and the second storage device 4, when data and the configuration information of all logical devices of the first storage device 3 are copied to the second storage device 4, and confirms that the data and the configuration information of all the logical devices of the first storage device 3 can be copied to the second storage device 4.

Fifth Embodiment

With reference to FIGS. 26 to 30, the fifth embodiment of the present invention will be described. This embodiment corresponds to a modification of the first to third embodiments. A feature of this embodiment resides in that the migration command program 22 notifies the administrator 8 of a proposed logical device to be migrated, when the administrator 8 selects a logical device to be migrated to the second storage device 4.

Figure 26:
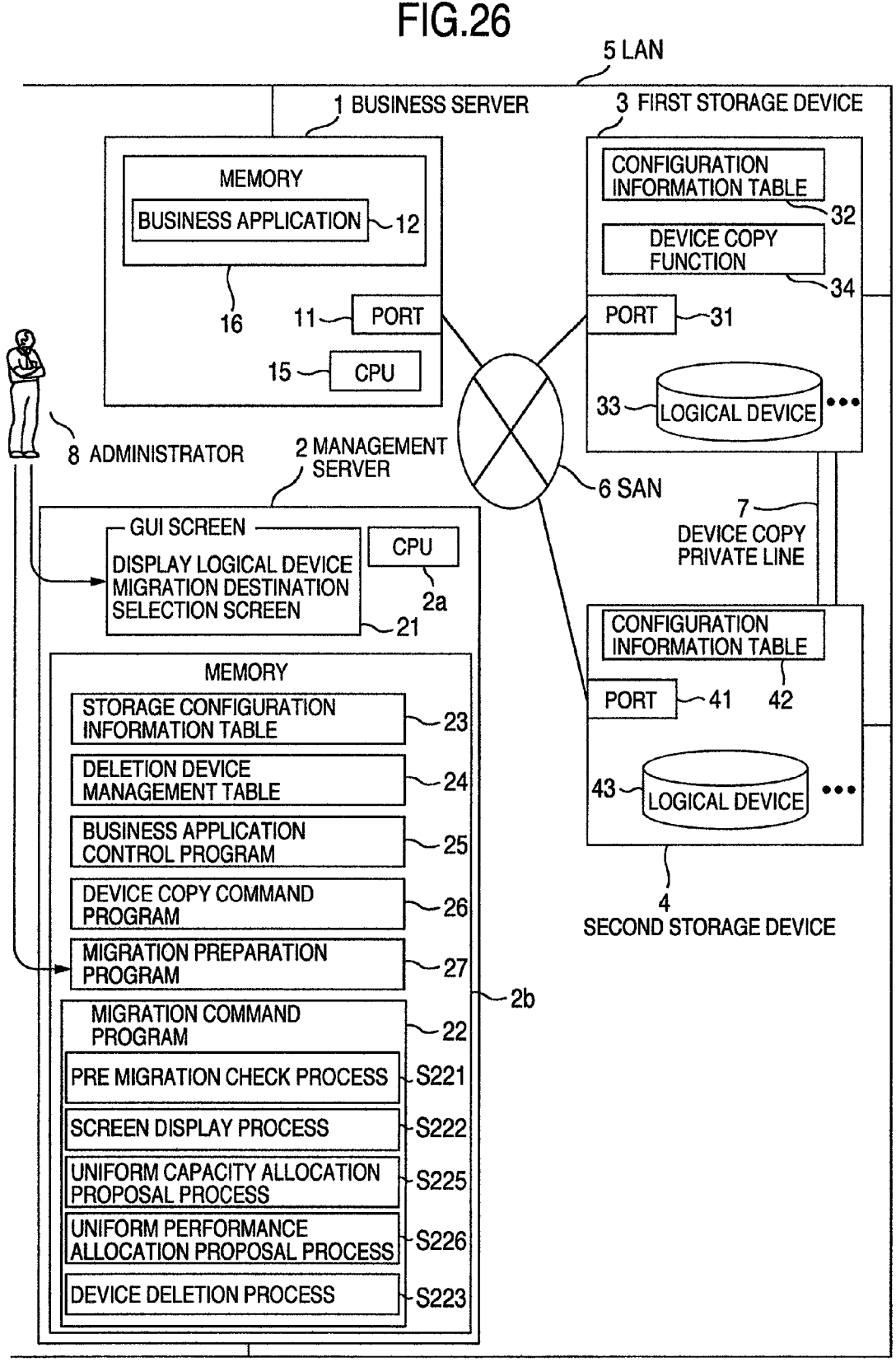
FIG. 26 is a block diagram of a storage management system according to a fifth embodiment.

FIG. 26 is a block diagram showing a storage management system according to the fifth embodiment. A different point of this embodiment from the first embodiment is that a uniform capacity allocation proposal process S225 and a uniform performance allocation proposal process S226 are added to the migration command program 22. Like constituent elements to those shown in FIG. 1 are represented by identical reference numerals, and the description thereof is omitted.

Figure 27:
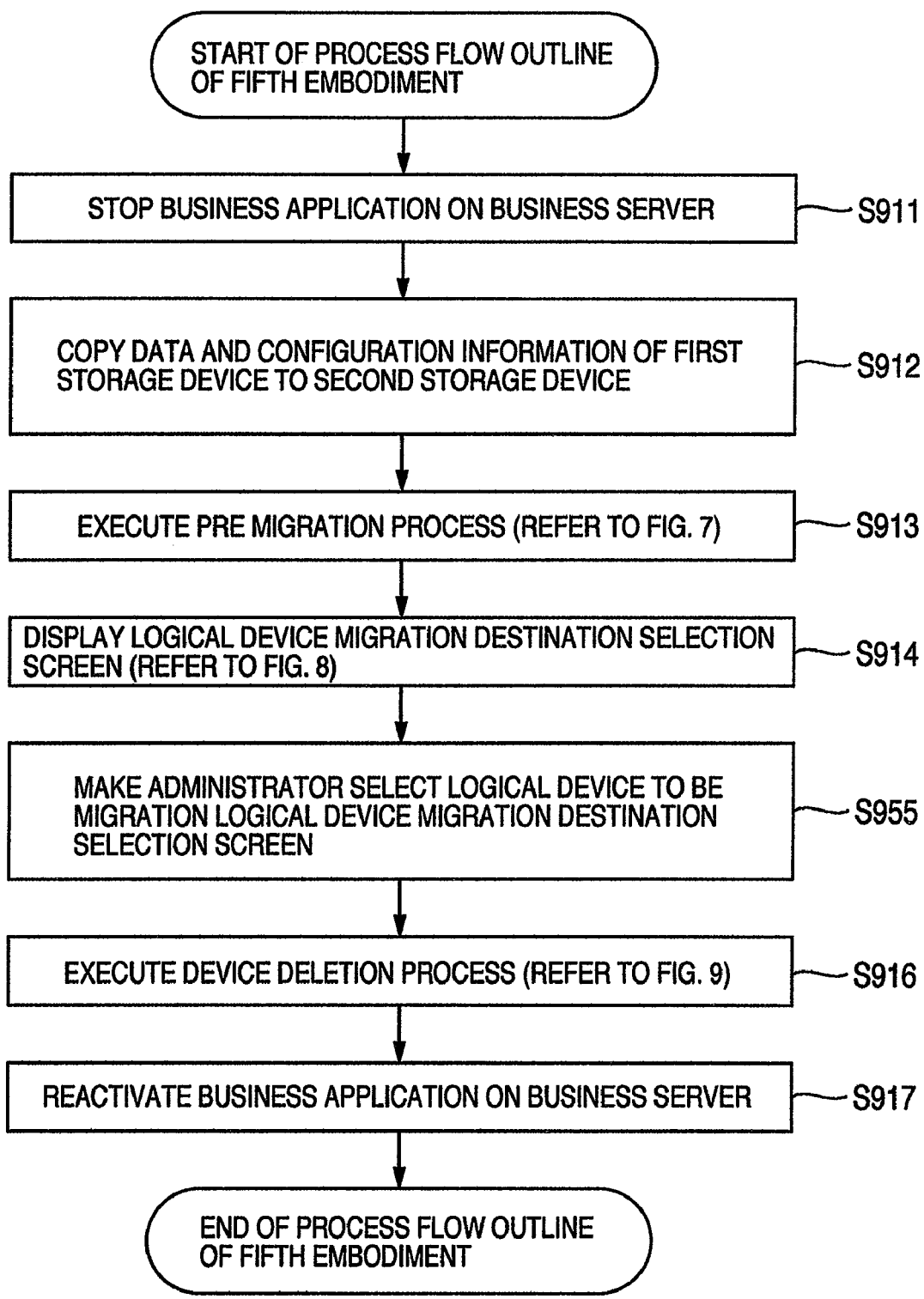
FIG. 27 is a flow chart illustrating an outline of a data migration process according to the fifth embodiment.

FIG. 27 is a flow chart illustrating the outline of a data migration process according to the fifth embodiment. Description will be made by referring to FIG. 26 when necessary. Similar to the first embodiment, processes S911 to S914 are executed. Next, in a process S955 the administrator 8 selects a logical device to be migrated from the first storage device 3 to the second storage device 4, on the logical device migration destination selection screen displayed in the process S914. In this case, a uniform capacity allocation button 2115 and a uniform performance allocation button 2116 for making the migration command program 22 propose a logical device to be migrated, are displayed on the screen. If the administrator 8 depresses these buttons, the administrator 8 is not required to select a logical device to be migrated. Similar to the first embodiment, processes S916 and S917 are executed. The outline of the process flow of the fifth embodiment has been described above.

With reference to FIG. 26 and FIGS. 28 to 30, description will be made on different processes of this embodiment from those of the first embodiment. Similar to the first embodiment, the processes from making the administrator 8 execute migration command program 22 to displaying the logical device migration command selection screen on the GUI screen 21, are similar to those of the first embodiment. In the first embodiment, the logical device migration destination selection screen shown in FIGS. 3 and 4 is displayed, whereas in this embodiment, a logical device migration destination selection screen shown in FIGS. 28 and 4 is displayed.

FIG. 28 is an illustrative diagram showing another example of the logical device migration destination selection screen. As different from FIG. 3, the uniform capacity allocation button 2115 and uniform performance allocation button 2116 are displayed under the logical device migration destination selection area 2111. As the administrator 8 depresses these buttons, the migration command program 22 proposes the allocation of logical devices after migration in the logical device allocation area 2112 after migration. As the administrator 8 depresses the uniform capacity allocation button 2115, a uniform capacity allocation proposal process S225 is executed. The uniform capacity allocation proposal process S225 will be described by referring to FIG. 29.

FIG. 29 is a flow chart illustrating the uniform capacity allocation proposal process. In a process S2251 the uniform capacity allocation proposal process S225 prepares arrays 1 and 2 for storing a logical device and its capacity information. Next, in a process S2252 logical devices and their capacity information are acquired from the storage configuration information table 23, in the order of larger capacity. Next, in a process S2253 it is checked whether a total capacity of logical devices registered in the array 1 is larger than a total capacity of logical devices registered in the array 2. If larger (Yes in the process S2253), in a process S2254 the logical devices and their capacity information are registered in the array 2, to thereafter advance to a process S2256. If smaller (No in the process S2253), in a process S2255 the logical devices and their capacity information are registered in the array 1, to thereafter advance to the process S2256.

In the process S2256 it is checked whether all logical devices are acquired from the storage configuration information table. If not acquired (No in the process S2256), the processes 2256 and S2257 are executed repetitively. If acquired (Yes in the process S2256), in a process S2257 the arrays 1 and 2 are returned, to thereafter terminate the uniform capacity allocation proposal process S225. The migration command program 22 displays logical device list information of the array 1 for the first storage device and logical device list information of the array 2 for the second storage device, respectively in the logical device allocation area after migration.

Next, description will be made on the process to be executed when the administrator 8 depresses the uniform performance allocation button 2116. As the administrator 8 depresses the uniform performance allocation button 2116, a uniform performance allocation proposal process S226 is executed. The uniform performance allocation proposal process S226 will be described by referring to FIG. 30.

Figure 30:
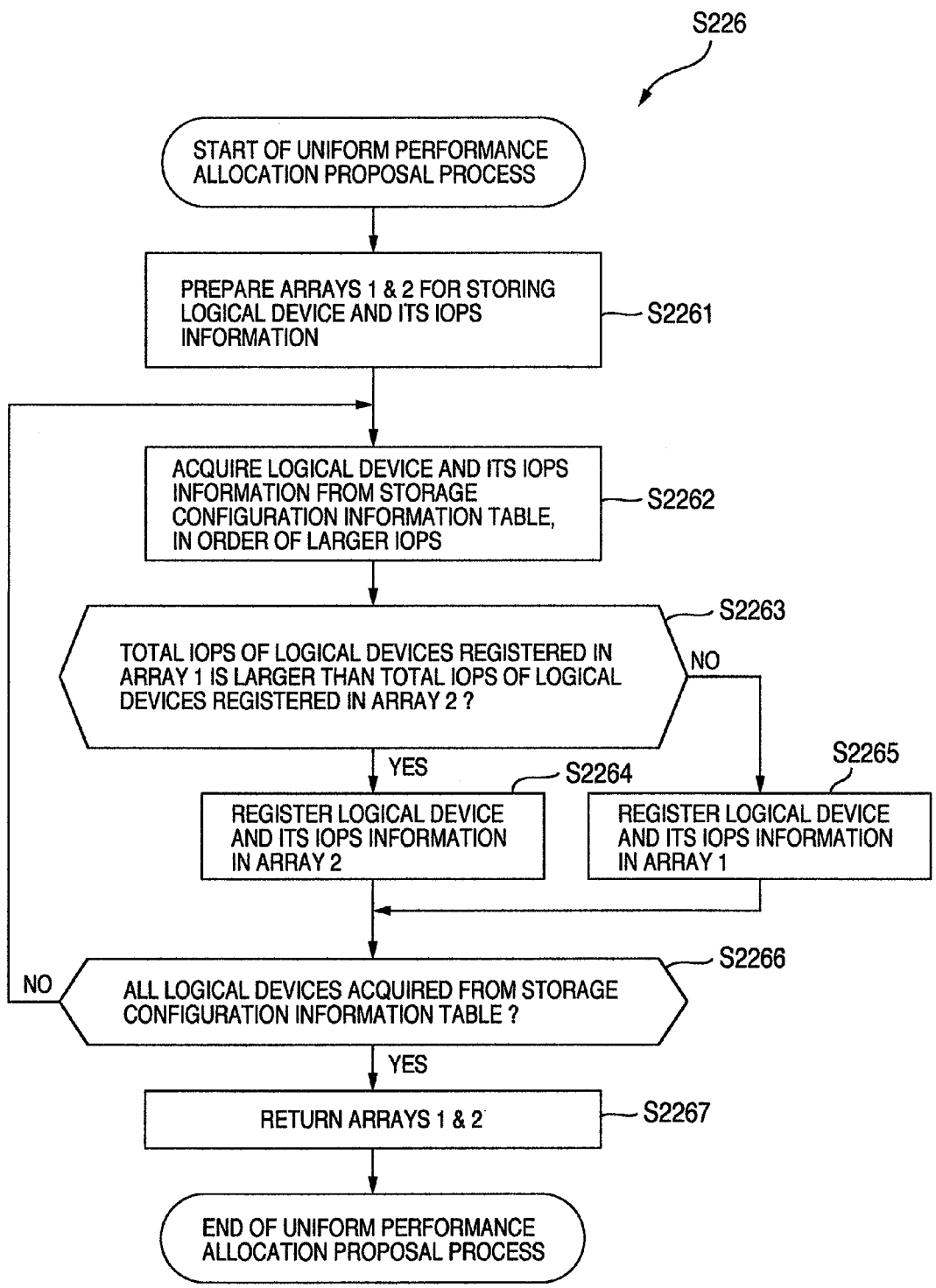
FIG. 30 is a flow chart illustrating a uniform performance allocation proposal process.

FIG. 30 is a flow chart illustrating the uniform performance allocation proposal process. In a process S2261 the uniform performance allocation proposal process S226 prepares arrays 1 and 2 for storing logical devices and their IOPS information. Next, in a process S2262 logical devices and their IOPS information are acquired from the storage configuration information table 23, in the order of larger IOPS. Next, in a process S2263 it is checked whether a total IOPS of the logical devices registered in the array 1 is larger than a total IOPS of the logical devices registers in the array 2. If larger (Yes in the process S2263), in a process S2264 the logical devices and their IOPS information are registered in the array 2, to thereafter advance to a process S2266. If not larger (No in the process S2263), in a process S2265 logical devices and their IOPS Information are registered in the array 1, to thereafter advance to the process S2266.

In the process S2266 it is checked whether all logical devices are acquired from the storage configuration information table. If not acquired (No in the process S2266), the processes S2262 to S2266 are executed repetitively. If acquired (Yes in the process S2266), in a process S2267 the arrays 1 and 2 are returned, to thereafter terminate the uniform performance allocation proposal process S226. The migration command program 22 displays logical device list information of the array 1 for the first storage device and logical device list information of the array 2 for the second storage device, respectively in the logical device allocation area after migration.

Next, the administrator 8 confirms the contents proposed by the uniform capacity allocation proposal process S225 or uniform performance allocation proposal process S226 by looking into the logical device allocation area 2112 after migration, and if the administrator desires to add any change, then a pull-down menu for the migration destination device is operated in the logical device migration destination selection area 2111 so that the allocation of logical devices can be changed, similar to the first embodiment. The administrator 8 confirms the migration destination of each logical device and depresses a NEXT button 2113. In response to a depression even of the NEXT button 2113, the migration command program 22 displays the logical device migration destination selection screen 2 shown in FIG. 4. The processes to follow are similar to those of the first embodiment.

In this embodiment, although the uniform capacity allocation proposal process S225 and uniform performance allocation proposal process S226 are used as the allocation proposal process, a different proposal process algorithm may also be used.

According to the data migration method of this embodiment, the management server 2 displays whether each logical device of the first storage device 3 is retained in the first storage device 3 or migrated to the second storage device 4, in accordance with calculation of uniformly allocating capacities of the first storage device 3 and the second storage device 4 or calculation of uniformly allocating process performances of the first storage device 3 and the second storage device 4, when the screen is displayed for making the administrator select whether each logical device possessed by the first storage device 3 is retained in the first storage device 3 or migrated to the second storage device 4.

According to the present invention, the business application 12 is operated by using the business server 1 and first storage device 3, and if the capacity and performance of data using the business application 12 become insufficient, the second storage device 4 is additionally installed to compensate for insufficiency. In this case, the management server 2 collectively copies data and configuration information of the existing first storage device 3 to the additional second storage device 4, and the data and configuration information are deleted at a later time in accordance with the migration command information selected from the GUI screen 21. Accordingly, necessary data and its configuration information in the existing first storage device 3 can be migrated to the additional second storage device 4, without making a user be conscious of the details of the configuration information of logical devices of the storage device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. A data migration method in a computer system manages an operation of a first storage device having one or more logical devices and an on-line data sync unit, and manages an operation of a business server by using a storage management server, the first storage device, the business server and the storage management server being interconnected via a network, the data migration method migrating the logical device possessed by the first storage device to a second storage device having one or more logical devices when the second storage device is additionally installed, the data migration method comprising steps of:

copying data and configuration information of all logical devices possessed by the first storage device, to the second storage device, by using the on-line data sync unit;

stopping the application on the business server which accesses the first storage device;

displaying a screen for an administrator to make a selection as to whether each logical device possessed by the first storage device is retained in the first storage device or migrated to the second storage device;

upon reception of a migration command that is based on the selection made by the administrator, deleting from the first storage device the data and the configuration information of each logical device possessed by the first storage device and selected by the administrator to be migrated to the second storage device;

upon reception of a retention command that is based on the selection made by the administrator, deleting from the second storage device the data and the configuration information of each logical device possessed by the second storage device and selected by the administrator to be retained in the first storage device;

reactivating the application to allow the application to access the logical devices of the first storage device and the second storage device;

restricting the application on the business server so as not to access the logical device possessed by the second storage device;

synchronizing data of the first storage device and the second storage device during a predetermined period, and confirming that an initial defect does not exist in the second storage device; and upon reception of the migration command that is based on the selection made by the administrator, restricting the application on the business server from accessing each logical device possessed by the first storage device and selected by the administrator to be migrated to the second storage device, and allowing the application on the business server to access each logical device possessed by the second storage device and to which each logical device possessed by the first storage device is migrated, based on the selection by the administrator.

2. The data migration method according to claim 1, wherein the storage management server compares the hardware structures of the first storage device and the second storage device, when data and the configuration information of all logical devices of the first storage device are copied to the second storage device, and confirms that the data and the configuration information of all the logical devices of the first storage device can be copied to the second storage device.

3. The data migration method according to claim 1, wherein the storage management server displays whether each logical device of the first storage device is retained in the first storage device or migrated to the second storage device, in accordance with a calculation of uniformly allocating capacities of the first storage device and the second storage device or a calculation of uniformly allocating process performances of the first storage device and the second storage device, when the screen is displayed for making the administrator select whether each logical device possessed by the first storage device is retained in the first storage device or migrated to the second storage device.

4. A data migration system in a computer system which manages an operation of a first storage device having one or more logical devices, and manages an on-line data sync unit and an operation of a business server by using a storage management server, the first storage device, the business server and the storage management server being interconnected via a network, the data migration system migrating the logical device possessed by the first storage device to a second storage device having one or more logical devices when the second storage device is additionally installed, the data migration system comprising:

a copying unit which copies data and configuration information of all logical devices possessed by the first storage device, to the second storage device, by using the on-line data sync unit;

a stopping unit which stops the application on the business server which accesses the first storage device;

a displaying unit which displays a screen for an administrator to make a selection as to whether each logical device possessed by the first storage device is retained in the first storage device or migrated to the second storage device;

a deleting unit, which upon reception of a migration command that is based on the selection made by the administrator, deletes from the first storage device the data and the configuration information of each logical device possessed by the first storage device and selected by the administrator to be migrated to the second storage device, and which upon reception of a retention command that is based on the selection made by the administrator, deletes from migrated to the second storage device, and which upon reception of a retention command that is based on the selection made by the administrator, deletes from the second storage device the data and the configuration information of each logical device possessed by the second storage device and selected by the administrator to be retained in the first storage device;

a reactivating unit which reactivates the application to allow the application to access the logical devices of the first storage device and the second storage device;

a restricting unit which restricts the application on the business server so as not to access the logical device possessed by the second storage device;
a synchronizing unit which synchronizes data of the first storage device and the second storage device during a predetermined period, and confirms that an initial defect does not exist in the second storage device; and
a restricting unit, which upon reception of the migration command that is based on the selection made by the administrator, restricts the application on the business server from accessing each logical device possessed by the first storage device and selected by the administrator to be migrated to the second storage device, and allows the application on the business server to access each logical device possessed by the second storage device and to which each logical device possessed by the first storage device is migrated, based on the selection by the administrator.

5. The data migration system according to claim 4, further comprising a copy availability confirming unit wherein the storage management server compares the hardware structures of the first storage device and the second storage device, when data and the configuration information of all logical devices of the first storage device are copied to the second storage device, and confirms that the data and the configuration information of all the logical devices of the first storage device can be copied to the second storage device.

6. The data migration system according to claim 4, wherein the displaying unit further displays whether each logical device of the first storage device is retained in the first storage device or migrated to the second storage device, in accordance with a calculation of uniformly allocating capacities of the first storage device and the second storage device or a calculation of uniformly allocating process performances of the first storage device and the second storage device, when the screen is displayed for making the administrator select whether each logical device possessed by the first storage device is retained in the first storage device or migrated to the second storage device.

7. A data migration program in a computer system which manages an operation of a first storage device having one or more logical devices and an on-line data sync unit, and manages an operation of a business server by using a storage management server, the first storage device, the business server and the storage management server being interconnected via a network, the data migration program system migrating the logical device possessed by the first storage device to a second storage device having one or more logical devices when the second storage device is additionally installed, the data migration program causing a computer to execute:

a copying process which copies data and configuration information of all logical devices possessed by the first storage device, to the second storage device, by using the on-line data sync unit;
a stopping process which stops the application on the business server which accesses the first storage device;
a displaying process which displays a screen for an administrator to make a selection as to whether each logical device possessed by the first storage device is retained in the first storage device or migrated to the second storage device;
a deleting process, which upon reception of a migration command that is based on the selection made by the administrator, deletes from the first storage device the data and the configuration information of each logical device possessed by the first storage device and selected by the administrator to be migrated to the second storage device, and which upon reception of a retention command that is based on the selection made by the administrator, deletes from the second storage device the data and the configuration information of each logical device possessed by the second storage device and selected by the command that is based on the selection made by the administrator, deletes from the second storage device the data and the configuration information of each logical device possessed by the second storage device and selected by the administrator to be retained in the first storage device;
a reactivating process which reactivates the application to allow the application to access the logical devices of the first storage device and the second storage device;
a restricting process which restricts the application on the business server so as not to access the logical device possessed by the second storage device;
a synchronizing process which synchronizes data of the first storage device and the second storage device during a predetermined period, and confirms that an initial defect does not exist in the second storage device; and
a restricting process, which upon reception of the migration command that is based on the selection made by the administrator, restricts the application on the business server from accessing each logical device possessed by the first storage device and selected by the administrator to be migrated to the second storage device, and allows the application on the business server to access each logical device possessed by the second storage device and to which each logical device possessed by the first storage device is migrated, based on the selection by the administrator.

* * * * *